(12) United States Patent
West et al.

(10) Patent No.: US 11,795,400 B2
(45) Date of Patent: Oct. 24, 2023

(54) COKE OVENS HAVING MONOLITH COMPONENT CONSTRUCTION

(71) Applicant: SUNCOKE TECHNOLOGY AND DEVELOPMENT LLC, Lisle, IL (US)

(72) Inventors: Gary Dean West, Lisle, IL (US); John Francis Quanci, Haddonfield, NJ (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 17/190,720

(22) Filed: Mar. 3, 2021

(65) Prior Publication Data

US 2021/0363426 A1    Nov. 25, 2021

Related U.S. Application Data

(62) Division of application No. 15/511,036, filed as application No. PCT/US2015/050295 on Sep. 15, 2015, now Pat. No. 10,968,393.
(Continued)

(51) Int. Cl.
*C10B 29/02* (2006.01)
*C10B 29/04* (2006.01)
(Continued)

(52) U.S. Cl.
CPC .............. *C10B 29/02* (2013.01); *C10B 5/06* (2013.01); *C10B 15/02* (2013.01); *C10B 29/04* (2013.01)

(58) Field of Classification Search
CPC ........... C10B 15/02; C10B 5/06; C10B 29/02; C10B 29/04
See application file for complete search history.

(56) References Cited

U.S. PATENT DOCUMENTS

| 425,797 A | 4/1890 | Hunt |
| 469,868 A | 3/1892 | Osbourn |

(Continued)

FOREIGN PATENT DOCUMENTS

| CA | 1172895 | 8/1984 |
| CA | 2775992 | 5/2011 |

(Continued)

OTHER PUBLICATIONS

CN102584294A_ENG (Google Translate manual translation of Bai) (Year: 2012).*
(Continued)

*Primary Examiner* — Gabriel E Gitman
(74) *Attorney, Agent, or Firm* — Perkins Coie LLP

(57) ABSTRACT

The present technology is generally directed to horizontal heat recovery and non-heat recovery coke ovens having monolith components. In some embodiments, an HHR coke oven includes a monolith component that spans the width of the oven between opposing oven sidewalls. The monolith expands upon heating and contracts upon cooling as a single structure. In further embodiments, the monolith component comprises a thermally-volume-stable material. The monolith component may be a crown, a wall, a floor, a sole flue or combination of some or all of the oven components to create a monolith structure. In further embodiments, the component is formed as several monolith segments spanning between supports such as oven sidewalls. The monolith component and thermally-volume-stable features can be used in combination or alone. These designs can allow the oven to be turned down below traditionally feasible temperatures while maintaining the structural integrity of the oven.

9 Claims, 18 Drawing Sheets

Related U.S. Application Data

(60) Provisional application No. 62/050,738, filed on Sep. 15, 2014.

(51) Int. Cl.
*C10B 15/02* (2006.01)
*C10B 5/06* (2006.01)

(56) References Cited

U.S. PATENT DOCUMENTS

| | | |
|---|---|---|
| 705,926 A | 7/1902 | Hemingway |
| 760,372 A | 5/1904 | Beam |
| 845,719 A | 2/1907 | Schniewind |
| 875,989 A | 1/1908 | Garner |
| 976,580 A | 7/1909 | Krause |
| 1,140,798 A | 5/1915 | Carpenter |
| 1,378,782 A | 5/1921 | Griffin |
| 1,424,777 A | 8/1922 | Schondeling |
| 1,429,346 A | 9/1922 | Avera |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Smith |
| 2,667,185 A | 1/1954 | Beavers |
| 2,723,725 A | 11/1955 | Keiffer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,015,893 A | 1/1962 | McCreary |
| 3,026,715 A | 3/1962 | Briggs |
| 3,033,764 A | 5/1962 | Hannes |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,453,839 A | 7/1969 | Sabin |
| 3,462,345 A | 8/1969 | Kernan |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A * | 7/1971 | Thompson .............. C10B 29/00 202/145 |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shortell et al. |
| 4,176,013 A | 11/1979 | Garthus et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |

(56) References Cited

U.S. PATENT DOCUMENTS

| | | | |
|---|---|---|---|
| 4,226,113 A | 10/1980 | Pelletier et al. |
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,298,497 A | 11/1981 | Colombo |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,406,619 A | 9/1983 | Oldengott |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,603,810 A | 2/1997 | Michler |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,059,932 A | 5/2000 | Sturgulewski |
| 6,126,910 A | 10/2000 | Wilhelm et al. |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |

(56) References Cited

U.S. PATENT DOCUMENTS

| | | |
|---|---|---|
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,383,055 B2 | 2/2013 | Palmer |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,435,042 B1 | 10/2019 | Weymouth |
| 10,526,541 B2 | 1/2020 | West et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Celia et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 11,008,517 B2 | 5/2021 | Chun et al. |
| 11,008,518 B2 | 5/2021 | Quanci et al. |
| 11,021,655 B2 | 6/2021 | Quanci et al. |
| 11,053,444 B2 | 7/2021 | Quanci et al. |
| 11,098,252 B2 | 8/2021 | Quanci et al. |
| 11,117,087 B2 | 9/2021 | Quanci |
| 11,142,699 B2 | 10/2021 | West et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |

(56) References Cited

U.S. PATENT DOCUMENTS

| | | |
|---|---|---|
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0156584 A1 | 6/2014 | Motukuri et al. |
| 2014/0182683 A1 | 7/2014 | Quanci et al. |
| 2014/0208997 A1 | 7/2014 | Alferyev et al. |
| 2014/0224123 A1 | 8/2014 | Walters |
| 2014/0262726 A1 | 9/2014 | West et al. |
| 2015/0041304 A1 | 2/2015 | Klim et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0219530 A1 | 8/2015 | Li et al. |
| 2015/0226499 A1 | 8/2015 | Mikkelsen |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0319198 A1 | 11/2016 | Quanci et al. |
| 2016/0370082 A1 | 12/2016 | Olivo |
| 2017/0173519 A1 | 6/2017 | Naito |
| 2017/0182447 A1 | 6/2017 | Sappok et al. |
| 2017/0183569 A1 | 6/2017 | Quanci et al. |
| 2017/0226425 A1 | 8/2017 | Kim et al. |
| 2017/0261417 A1 | 9/2017 | Zhang |
| 2017/0313943 A1 | 11/2017 | Valdevies |
| 2017/0352243 A1 | 12/2017 | Quanci et al. |
| 2018/0340122 A1 | 11/2018 | Crum et al. |
| 2019/0169503 A1 | 6/2019 | Chun et al. |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2020/0206669 A1 | 7/2020 | Quanci et al. |
| 2020/0206683 A1 | 7/2020 | Quanci et al. |
| 2020/0208058 A1 | 7/2020 | Quanci et al. |
| 2020/0208059 A1 | 7/2020 | Quanci et al. |
| 2020/0208060 A1 | 7/2020 | Quanci et al. |
| 2020/0208062 A1 | 7/2020 | Quanci et al. |
| 2020/0208063 A1 | 7/2020 | Quanci et al. |
| 2020/0208833 A1 | 7/2020 | Quanci et al. |
| 2020/0231876 A1 | 7/2020 | Quanci et al. |
| 2020/0407641 A1 | 12/2020 | Quanci et al. |
| 2021/0024828 A1 | 1/2021 | Ball et al. |
| 2021/0032541 A1 | 2/2021 | Crum et al. |
| 2021/0040391 A1 | 2/2021 | Quanci et al. |
| 2021/0130697 A1 | 5/2021 | Quanci et al. |
| 2021/0163821 A1 | 6/2021 | Quanci et al. |
| 2021/0163822 A1 | 6/2021 | Quanci et al. |
| 2021/0163823 A1 | 6/2021 | Quanci et al. |
| 2021/0198579 A1 | 7/2021 | Quanci et al. |
| 2021/0340454 A1 | 11/2021 | Quanci et al. |
| 2021/0363426 A1 | 11/2021 | West et al. |
| 2021/0363427 A1 | 11/2021 | Quanci et al. |
| 2021/0371752 A1 | 12/2021 | Quanci et al. |
| 2022/0056342 A1 | 2/2022 | Quanci et al. |
| 2022/0298423 A1 | 9/2022 | Quanci et al. |
| 2022/0325183 A1 | 10/2022 | Quanci et al. |
| 2022/0356410 A1 | 11/2022 | Quanci et al. |
| 2023/0012031 A1 | 1/2023 | Quanci et al. |

FOREIGN PATENT DOCUMENTS

| | | | | |
|---|---|---|---|---|
| CA | 2822841 | | 7/2012 | |
| CA | 2822857 | | 7/2012 | |
| CA | 2905110 A1 | | 9/2014 | |
| CN | 87212113 U | | 6/1988 | |
| CN | 87107195 A | | 7/1988 | |
| CN | 2064363 U | | 10/1990 | |
| CN | 2139121 Y | | 7/1993 | |
| CN | 1092457 A | | 9/1994 | |
| CN | 1255528 A | | 6/2000 | |
| CN | 1270983 A | | 10/2000 | |
| CN | 2528771 Y | | 2/2002 | |
| CN | 1358822 A | | 7/2002 | |
| CN | 2521473 Y | | 11/2002 | |
| CN | 1468364 A | | 1/2004 | |
| CN | 1527872 A | | 9/2004 | |
| CN | 2668641 | | 1/2005 | |
| CN | 1957204 A | | 5/2007 | |
| CN | 101037603 A | | 9/2007 | |
| CN | 101058731 A | | 10/2007 | |
| CN | 101157874 A | | 4/2008 | |
| CN | 101211495 A | | 7/2008 | |
| CN | 201121178 Y | | 9/2008 | |
| CN | 101395248 A | | 3/2009 | |
| CN | 100510004 C | | 7/2009 | |
| CN | 101486017 A | | 7/2009 | |
| CN | 201264981 Y | | 7/2009 | |
| CN | 101497835 A | | 8/2009 | |
| CN | 101509427 A | | 8/2009 | |
| CN | 101886466 A | | 11/2010 | |
| CN | 101910530 A | | 12/2010 | |
| CN | 102072829 A | | 5/2011 | |
| CN | 102155300 A | | 8/2011 | |
| CN | 2509188 Y | | 11/2011 | |
| CN | 202226816 | | 5/2012 | |
| CN | 202265541 U | | 6/2012 | |
| CN | 102584294 A | | 7/2012 | |
| CN | 102584294 A | * | 7/2012 | ............. C10B 29/02 |
| CN | 202415446 U | | 9/2012 | |
| CN | 202470353 U | | 10/2012 | |
| CN | 103399536 A | | 11/2013 | |
| CN | 103468289 A | | 12/2013 | |
| CN | 103913193 A | | 7/2014 | |
| CN | 203981700 U | | 12/2014 | |
| CN | 104498059 A | | 4/2015 | |
| CN | 105137947 A | | 12/2015 | |
| CN | 105189704 A | | 12/2015 | |
| CN | 105264448 A | | 1/2016 | |
| CN | 105467949 A | | 4/2016 | |
| CN | 106661456 A | | 5/2017 | |
| CN | 106687564 A | | 5/2017 | |
| CN | 107445633 A | | 12/2017 | |
| CN | 100500619 C | | 6/2020 | |
| DE | 201729 C | | 9/1908 | |
| DE | 212176 | | 7/1909 | |
| DE | 1212037 B | | 3/1966 | |
| DE | 2212544 A | | 1/1973 | |
| DE | 2720688 A1 | | 11/1978 | |
| DE | 3231697 C1 | | 1/1984 | |
| DE | 3328702 A1 | | 2/1984 | |
| DE | 3315738 C2 | | 3/1984 | |
| DE | 3329367 C | | 11/1984 | |
| DE | 3407487 C1 | | 6/1985 | |
| DE | 19545736 | | 6/1997 | |
| DE | 19803455 | | 8/1999 | |
| DE | 10122531 A1 | | 11/2002 | |
| DE | 10154785 | | 5/2003 | |
| DE | 102005015301 | | 10/2006 | |
| DE | 102006004669 | | 8/2007 | |
| DE | 102006026521 | | 12/2007 | |
| DE | 102009031436 | | 1/2011 | |
| DE | 102011052785 | | 12/2012 | |
| EA | 010510 B1 | | 10/2008 | |
| EP | 0126399 A1 | | 11/1984 | |
| EP | 0208490 A1 | | 1/1987 | |
| EP | 0903393 A2 | | 3/1999 | |
| EP | 1538503 A1 | | 6/2005 | |
| EP | 1860034 A1 | | 11/2007 | |
| EP | 2295129 A1 | | 3/2011 | |
| EP | 2468837 A1 | | 6/2012 | |
| FR | 2339664 | | 8/1977 | |
| FR | 2517802 | | 6/1983 | |
| FR | 2764978 | | 12/1998 | |
| GB | 364236 A | | 1/1932 | |
| GB | 368649 A | | 3/1932 | |
| GB | 441784 | | 1/1936 | |
| GB | 606340 | | 8/1948 | |
| GB | 611524 | | 11/1948 | |
| GB | 725865 | | 3/1955 | |
| GB | 871094 | | 6/1961 | |
| GB | 923205 A | | 5/1963 | |

(56) References Cited

FOREIGN PATENT DOCUMENTS

| | | | |
|---|---|---|---|
| JP | S50148405 | | 12/1975 |
| JP | 53019301 U | * 2/1978 | ............ C10B 29/02 |
| JP | S5319301 A | | 2/1978 |
| JP | 54054101 | | 4/1979 |
| JP | S5453103 A | | 4/1979 |
| JP | 57051786 | | 3/1982 |
| JP | 57051787 | | 3/1982 |
| JP | 57083585 | | 5/1982 |
| JP | 57090092 | | 6/1982 |
| JP | S57172978 A | | 10/1982 |
| JP | 58091788 | | 5/1983 |
| JP | 59051978 | | 3/1984 |
| JP | 59053589 | | 3/1984 |
| JP | 59071388 | | 4/1984 |
| JP | 59108083 | | 6/1984 |
| JP | 59145281 | | 8/1984 |
| JP | 60004588 | | 1/1985 |
| JP | 61106690 | | 5/1986 |
| JP | 62011794 | | 1/1987 |
| JP | 62285980 | | 12/1987 |
| JP | 01103694 | | 4/1989 |
| JP | 01249886 | | 10/1989 |
| JP | H0319127 | | 3/1991 |
| JP | 03197588 | | 8/1991 |
| JP | 04159392 | | 6/1992 |
| JP | H04178494 A | | 6/1992 |
| JP | H05230466 A | | 9/1993 |
| JP | H0649450 A | | 2/1994 |
| JP | H0654753 U | | 7/1994 |
| JP | H06264062 | | 9/1994 |
| JP | H06299156 A | | 10/1994 |
| JP | 07188668 | | 7/1995 |
| JP | 07216357 | | 8/1995 |
| JP | H07204432 | | 8/1995 |
| JP | H08104875 A | | 4/1996 |
| JP | 08127778 | | 5/1996 |
| JP | H10273672 A | | 10/1998 |
| JP | H11131074 | | 5/1999 |
| JP | H11256166 A | | 9/1999 |
| JP | 2000204373 A | | 7/2000 |
| JP | 2000219883 A | | 8/2000 |
| JP | 2001055576 A | | 2/2001 |
| JP | 2001200258 | | 7/2001 |
| JP | 2002097472 A | | 4/2002 |
| JP | 2002106941 | | 4/2002 |
| JP | 2003041258 | | 2/2003 |
| JP | 2003051082 A | | 2/2003 |
| JP | 2003071313 A | | 3/2003 |
| JP | 2003292968 A | | 10/2003 |
| JP | 2003342581 A | | 12/2003 |
| JP | 2004169016 A | | 6/2004 |
| JP | 2005503448 A | | 2/2005 |
| JP | 2005135422 A | | 5/2005 |
| JP | 2005154597 A | | 6/2005 |
| JP | 2005263983 A | | 9/2005 |
| JP | 2005344085 A | | 12/2005 |
| JP | 2006188608 A | | 7/2006 |
| JP | 2007063420 A | | 3/2007 |
| JP | 4101226 B2 | | 6/2008 |
| JP | 2008231278 A | | 10/2008 |
| JP | 2009019106 A | | 1/2009 |
| JP | 2009073864 A | | 4/2009 |
| JP | 2009073865 A | | 4/2009 |
| JP | 2009135276 A | | 6/2009 |
| JP | 2009144121 | | 7/2009 |
| JP | 2010229239 A | | 10/2010 |
| JP | 2010248389 A | | 11/2010 |
| JP | 2011504947 A | | 2/2011 |
| JP | 2011068733 A | | 4/2011 |
| JP | 2011102351 A | | 5/2011 |
| JP | 2012102302 | | 5/2012 |
| JP | 2013006957 A | | 1/2013 |
| JP | 2013510910 | | 3/2013 |
| JP | 2013189322 A | | 9/2013 |
| JP | 2014040502 A | | 3/2014 |
| JP | 2015094091 A | | 5/2015 |
| JP | 2016169897 A | | 9/2016 |
| KR | 1019960008754 | | 10/1996 |
| KR | 19990017156 U | | 5/1999 |
| KR | 1019990054426 | | 7/1999 |
| KR | 20000042375 A | | 7/2000 |
| KR | 100296700 B1 | | 10/2001 |
| KR | 20030012458 A | | 2/2003 |
| KR | 1020040020883 A | | 3/2004 |
| KR | 20040107204 A | | 12/2004 |
| KR | 20050053861 A | | 6/2005 |
| KR | 20060132336 A | | 12/2006 |
| KR | 100737393 B1 | | 7/2007 |
| KR | 100797852 | | 1/2008 |
| KR | 20080069170 A | | 7/2008 |
| KR | 20110010452 A | | 2/2011 |
| KR | 101314288 | | 4/2011 |
| KR | 20120033091 A | | 4/2012 |
| KR | 20130050807 | | 5/2013 |
| KR | 101318388 | | 10/2013 |
| KR | 20140042526 A | | 4/2014 |
| KR | 20150011084 A | | 1/2015 |
| KR | 20170038102 A | | 4/2017 |
| KR | 20170058808 A | | 5/2017 |
| KR | 20170103857 A | | 9/2017 |
| KR | 101862491 B1 | | 5/2018 |
| RU | 2083532 C1 | | 7/1997 |
| RU | 2441898 C2 | | 2/2012 |
| RU | 2493233 C2 | | 9/2013 |
| SU | 1535880 A1 | | 1/1990 |
| TW | 201241166 A1 | | 10/2012 |
| TW | 201245431 A1 | | 11/2012 |
| UA | 50580 | | 10/2002 |
| WO | WO9012074 | | 10/1990 |
| WO | WO9945083 | | 9/1999 |
| WO | WO02062922 | | 8/2002 |
| WO | WO2005023649 | | 3/2005 |
| WO | WO2005031297 | | 4/2005 |
| WO | WO2005115583 | | 12/2005 |
| WO | WO2007103649 | | 9/2007 |
| WO | WO2008034424 | | 3/2008 |
| WO | WO2008105269 | | 9/2008 |
| WO | WO2011000447 | | 1/2011 |
| WO | WO2011126043 | | 10/2011 |
| WO | WO2012029979 | | 3/2012 |
| WO | WO2012031726 | | 3/2012 |
| WO | WO2013023872 | | 2/2013 |
| WO | WO2010107513 | | 9/2013 |
| WO | WO2014021909 | | 2/2014 |
| WO | WO2014043667 | | 3/2014 |
| WO | WO2014105064 | | 7/2014 |
| WO | WO2014153050 | | 9/2014 |
| WO | WO2016004106 | | 1/2016 |
| WO | WO2016033511 | | 3/2016 |
| WO | WO2016086322 | | 6/2016 |

OTHER PUBLICATIONS

JPS5319301A_ENG (Google Translate manual translation of Nakagawa) (Year: 1978).*
CN102584294A Eng (WIPO machine translation of Bai. see NPL filed on Sep. 22, 2022) (Year: 2012).*
U.S. Appl. No. 17/584,672, filed Jan. 26, 2022, Quanci et al.
Canadian Examination Report in Canadian Application No. 2,961,207; dated Mar. 25, 2022; 3 pages.
Japanese Notice of Rejection for Japanese Application No. 2020-134955; dated Mar. 29, 2022; 4 pages.
U.S. Appl. No. 17/155,818, filed Jan. 22, 2021, Jan. 22, 2021, Choi et al.
U.S. Appl. No. 17/191,119, filed Mar. 3, 2021, Mar. 3, 2021, Quanci et al.
U.S. Appl. No. 17/222,886, filed Apr. 5, 2021, Apr. 5, 2021, Quanci et al.
U.S. Appl. No. 17/228,469, filed Apr. 12, 2021, Apr. 12, 2021, Quanci et al.
U.S. Appl. No. 17/228,501, filed Apr. 12, 2021, Apr. 12, 2021, Quanci et al.

(56) References Cited

OTHER PUBLICATIONS

U.S. Appl. No. 17/306,895, filed May 3, 2021, May 3, 2021, Quanci et al.
U.S. Appl. No. 17/321,857, filed May 17, 2021, May 17, 2021, Quanci et al.
U.S. Appl. No. 17/320,343, filed May 24, 2021, May 24, 2021, Quanci et al.
U.S. Appl. No. 17/363,701, filed Jun. 30, 2021, Jun. 30, 2021, Quanci et al.
U.S. Appl. No. 17/388,874, filed Jul. 29, 2021, Jul. 29, 2021, Quanci et al.
U.S. Appl. No. 17/459,380, filed Aug, 27, 2021, Aug. 27, 2021, Quanci et al.
U.S. Appl. No. 17/471,491, filed Sep. 10, 2021, Sep. 10, 2021, West et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf; 404 pages.
Basset et al., "Calculation of steady flow pressure loss coefficients for pipe junctions," Proc Instn Meeh Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1—24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
Australian Examination Report No. 1 for Australian Application No. 2015284198; dated Dec. 21, 2018; 3 pages.
Australian Examination Report No. 1 for Australian Application No. 2015317909; dated Nov. 11, 2019; 3 pages.
Australian Examination Report No. 1 for Australian Application No. 2019284030; dated Nov. 20, 2020; 3 pages.
Brazilian Examination Report for Brazilian Application No. BR112015010451-7, dated Apr. 24, 2017, 3 pages.
Brazilian Preliminary Examination Report for Brazilian Application No. BR112016030880-8; dated Aug. 26, 2019; 7 pages.
Brazilian Preliminary Office Action for Brazilian Application No. BR112017004981-3; dated Sep. 24, 2019, 7 pages.
Canadian Office Action in Canadian Application No. 2,903,836, dated May 9, 2016, 6 pages.
Canadian Office Action in Canadian Application No. 2,903,836, dated Nov. 17, 2016, 4 pages.
Canadian Office Action in Canadian Application No. 2,954,063; dated Jul. 29, 2021; 3 pages.
Canadian Office Action in Canadian Application No. 2,961,207; dated Sep. 22, 2021; 4 pages.
Chinese Office Action in Chinese Application No. 201480014799.8, dated Jul. 14, 2016.
Chinese Office Action in Chinese Application No. 201480014799.8, dated Mar. 13, 2017.
Chinese Office Action in Chinese Application No. 201480014799.8; dated Jul. 7, 2017.
Chinese Decision of Rejection in Chinese Application No. 201480014799.8; dated Dec. 4, 2017; 18 pages.
Chinese Office Action in Chinese Application No. 201610146244.X; dated Sep. 11, 2018; 20 pages.
Chinese Office Action in Chinese Application No. 2015800387532.2; dated Mar. 28, 2019; 15 pages.
Chinese Office Action in Chinese Application No. 201580051361.1; dated May 31, 2019; 23 pages.

(56) References Cited

OTHER PUBLICATIONS

Colombian Office Action in Colombian Patent Application No. NC2017/0000523; dated Jul. 17, 2018; 7 pages.
Colombian Office Action in Colombian Patent No. NC2017/003281; dated Dec. 1, 2018; 13 pages.
Extended European Search Reportin European Patent Application No. 16161750.1, dated Aug. 19, 2016, 9 pages.
Extended European Search Report in European Application No. 14769676.9, dated Sep. 30, 2016, 7 pages.
Examination Report for European Application No. 14769676.9; dated Nov. 13, 2017; 4 pages.
Extended European Search Report for European Application No. 15815180.3; dated Jan. 22, 2018; 9 pages.
Extended European Search Report for European Application No. 15842460.6; dated May 18, 2018; 10 pages.
Examination Report for European Application No. 15842460.6; dated Apr. 4, 2019; 8 pages.
Examination Report for European Application No. 147696769; dated Apr. 7, 2020; 6 pages.
Extended European Search Report for European Appliction No. 15842460.6; dated Apr. 14, 2021; 5 pages.
India First Examination Report in Application No. 512/KOLNP/2015; dated Jun. 24, 2019; 8 pages.
India First Examination Report in Application No. 201637044911; dated Aug. 8, 2019; 9 pages.
India First Examination Report in Application No. 201737008983; dated Sep. 17, 2019; 8 pages.
International Search Report and Written Opinion of International Application No. PCT/US2014/028837; dated Aug. 21, 2014; 11 pages.
International Search Report and Written Opinion in International Application No. PCT/US2015/038663, dated Sep. 14, 2015, 14 pages.
International Search Report and Written Opinion in International Application No. PCT/US2015/050295, dated Nov. 17, 2015, 16 pages.
Japanese Notice of Rejection for Japanese Application No. 2017-514488; dated Aug. 6, 2019, 12 pages.
Japanese Final Notice of Rejection for Japanese Application No. 2017-514488; dated Apr. 7, 2020; 2 pages.
Japanese Notice of Rejection for Japanese Application No. 2020-134955; dated Sep. 7, 2021; 8 pages.
Korean Office Action for Korean Application No. 10-2016-7036961; dated Sep. 24, 2021; 8 pages.
Russian Office Action for Russian Application No. 2017112974/05; dated Feb. 21, 2019; 14 pages.
Ukraine Office Action for Ukraine Application No. a 2016 13568; dated Oct. 16, 2019; 3 pages.
Ukraine Office Action for Ukraine Application No. a 2017 02922; dated Jan. 28, 2020; 4 pages.
Ukraine Office Action for Ukraine Application No. a 2017 02922; dated Feb. 1, 2021; 5 pages.
U.S. Appl. No. 17/521,061, filed Nov. 8, 2021, Crum et al.
U.S. Appl. No. 17/526,477, filed Nov. 15, 2021, Quanci et al.
U.S. Appl. No. 17/532,058, filed Nov. 22, 2021, Quanci et al.
Korean Office Action for Korean Application No. 10-2017-7009352; dated Dec. 13, 2021; 37 pages.
U.S. Appl. No. 17/947,520, filed Sep. 19, 2022, Quanci et al.
U.S. Appl. No. 17/967,615, filed Oct. 17, 2022, Quanci et al.
U.S. Appl. No. 18/047,916, filed Oct. 19, 2022, Quanci et al.
U.S. Appl. No. 18/052,739, filed Nov. 4, 2022, Quanci et al.
U.S. Appl. No. 18/052,760, filed Nov. 4, 2022, Quanci et al.
U.S. Appl. No. 18/168,142, filed Feb. 13, 2023, Quanci et al.
"High Alumina Cement-Manufacture, Characteristics and Uses," TheConstructor.org, https://theconstructor.org/concrete/high-alumina-cement/23686/; 12 pages.
"Refractory Castables," Victas.com, Dec. 28, 2011 (date obtained from WayBack Machine), https://www/vitcas.com/refactory-castables; 5 pages.
Tiwari, et al., "A novel technique for assessing the coking potential of coals/cole blends for non-recovery coke making process," Fuel, vol. 107, May 2013, pp. 615-622.
Japanese Final Notice of Rejection for Japanese Application No. 2020-134955; dated Sep. 13, 2022; 4 pages.

\* cited by examiner

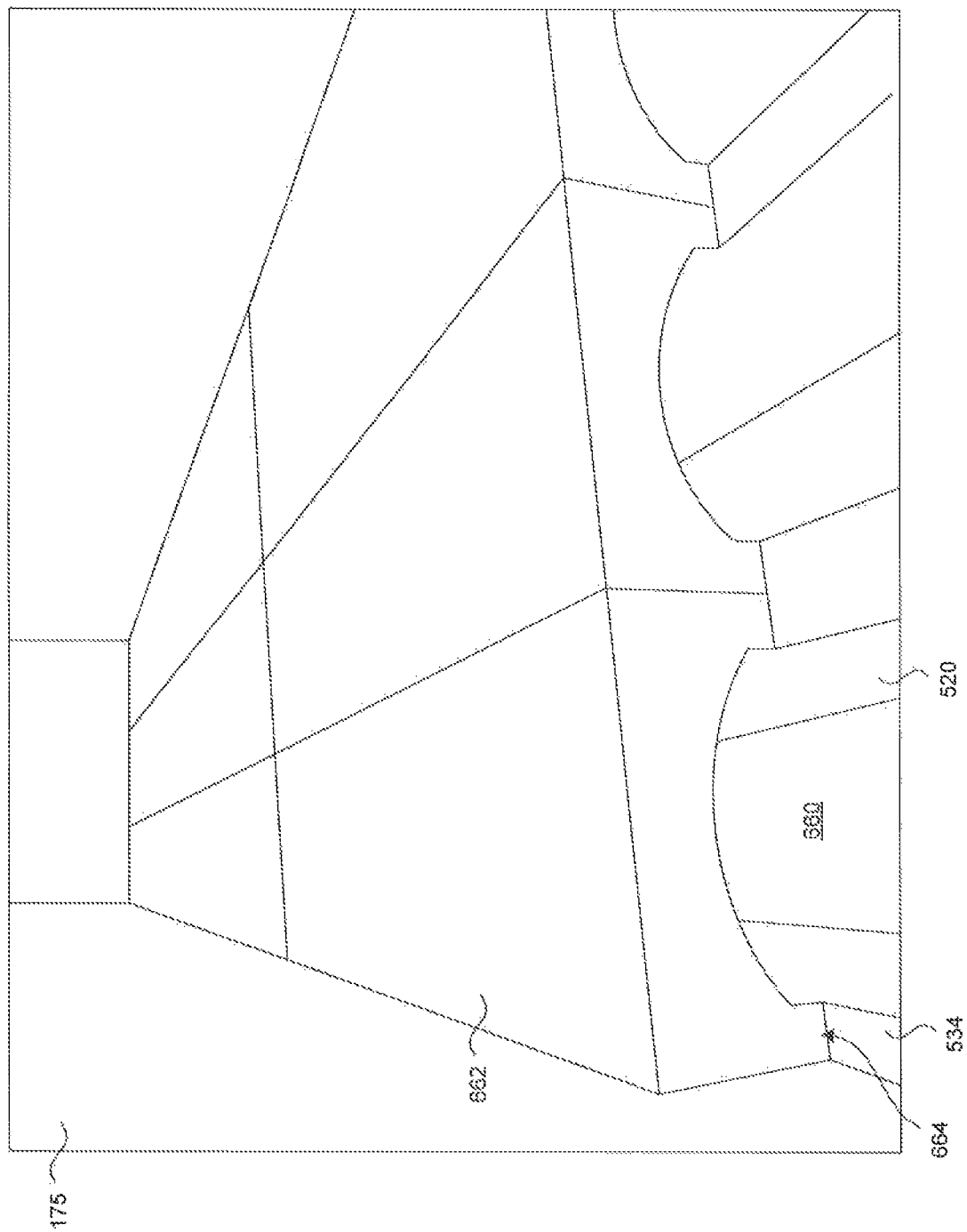

COKE OVENS HAVING MONOLITH COMPONENT CONSTRUCTION

CROSS-REFERENCE TO RELATED APPLICATIONS

This application is a divisional of U.S. patent application Ser. No. 15/511,036 filed Mar. 14, 2017, which is a U.S. national phase entry of PCT/US15/50295, which was filed on Sep. 15, 2015, which claims the benefit of priority to U.S. Provisional Patent Application No. 62/050,738 filed Sep. 15, 2014, the disclosures of which are incorporated herein by reference in their entireties.

TECHNICAL FIELD

The present technology is generally directed to use of precast geometric shapes in horizontal heat recovery coke ovens, non-heat recovery coke ovens, and beehive coke ovens, for example, use of a monolith components to construct a horizontal coke oven.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for 24 to 48 hours under closely-controlled atmospheric conditions. Coking ovens have been used for many years to convert coal into metallurgical coke. During the coking process, finely crushed coal is heated under controlled temperature conditions to devolatilin the coal and form a fused mass of coke having a predetermined porosity and strength. Because the production of coke is a batch process, multiple coke ovens are operated simultaneously.

The melting and fusion process undergone by the coal particles during the heating process is an important part of coking. The degree of melting and degree of assimilation of the coal particles into the molten mass determine the characteristics of the coke produced. In order to produce the strongest coke from a particular coal or coal blend, there is an optimum ratio of reactive to inert entities in the coal. The porosity and strength of the coke are important for the ore refining process and are determined by the coal source and/or method of coking.

Coal particles or a blend of coal particles are charged into hot ovens, and the coal is heated in the ovens in order to remove volatile matter ("VM") from the resulting coke. The coking process is highly dependent on the oven design, the type of coal, and the conversion temperature used. Typically, ovens are adjusted during the coking process so that each charge of coal is coked out in approximately the same amount of time. Once the coal is "coked out" or fully coked, the coke is removed from the oven and quenched with water to cool it below its ignition temperature. Alternatively, the coke is dry quenched with an inert gas. The quenching operation must also be carefully controlled so that the coke does not absorb too much moisture. Once it is quenched, the coke is screened and loaded into rail cars or trucks for shipment.

Because coal is fed into hot ovens, much of the coal feeding process is automated. In slot-type or vertical owns, the coal is typically charged through slots or openings in the top of the ovens. Such ovens tend to be tall and narrow. Horizontal non-recovery or heat recovery type coking ovens are also used to produce coke. In the non-recovery or heat recovery type coking ovens, conveyors are used to convey the coal particles horizontally into the ovens to provide an elongate bed of coal.

As the source of coal suitable for forming metallurgical coal ("coking coal") has decreased, attempts have been made to blend weak or lower quality coals ("non-coking coal") with coking coals to provide a suitable coal charge for the ovens. One way to combine non-coking and coking coals is to use compacted or stamp-charged coal. The coal may be compacted before or after it is in the oven. In some embodiments, a mixture of non-coking and coking coals is compacted to greater than 50 pounds per cubic foot in order to use non-coking coal in the coke making process. As the percentage of non-coking coal in the coal mixture is increased, higher levels of coal compaction are required (e.g., up to about 65 to 75 pounds per cubic foot). Commercially, coal is typically compacted to about 1.15 to 1.2 specific gravity (sg) or about 70-75 pounds per cubic foot.

Horizontal Heat Recovery ("EHR") ovens have a unique environmental advantage over chemical byproduct ovens based upon the relative operating atmospheric pressure conditions inside HHR ovens. HHR ovens operate under negative pressure, whereas chemical byproduct ovens operate at a slightly positive atmospheric pressure. Both oven types are typically constructed of refractory bricks and other materials in which creating a substantially airtight environment can be a challenge because small cracks can form in these structures during day-to-day operation. Chemical byproduct ovens are kept at a positive pressure to avoid oxidizing recoverable products and overheating the ovens. Conversely, HHR ovens are kept at a negative pressure, drawing in air from outside the oven to oxidize the coal's VM and to release the heat of combustion within the oven. It is important to minimize the loss of volatile gases to the environment, so the combination of positive atmospheric conditions and small openings or cracks in chemical byproduct ovens allow raw coke oven gas ("COG") and hazardous pollutants to leak into the atmosphere. Conversely, the negative atmospheric conditions and small openings or cracks in the HHR ovens or locations elsewhere in the coke plant simply allow additional air to be drawn into the oven or other locations in the coke plant so that the negative atmospheric conditions resist the loss of COG to the atmosphere.

HHR ovens have traditionally been unable to turn down their operation (e.g., their coke production) significantly below their designed capacity without potentially damaging the ovens. This restraint is linked to temperature limitations in the ovens. More specifically, traditional HHR ovens are primarily made of silica brick. When a silica oven is built, burnable spacers are placed between the bricks in the oven crown to allow for brick expansion. Once the oven is heated, the spacers burn away and the bricks expand into adjacency. Once HHR silica brick ovens are heated, they are never allowed to drop below the silica brick thermally-volume-stable temperature, the temperature above which silica is generally volume-stable (i.e., does not expand or contract). If the bricks drop below this temperature, the bricks start to contract. Since the spacers have burned out, a traditional crown can contract up to several inches upon cooling. This is potentially enough movement for the crown bricks to start to shift and potentially collapse. Therefore, enough heat must be maintained in the ovens to keep the bricks above the thermally-volume-stable temperature. This is the reason why it has been stated that a HHR oven can never be turned off. Because the ovens cannot be significantly turned down, during periods of low steel and coke demand, coke production must be sustained. Further, it can be difficult to perform maintenance on heated HHR ovens. Other portions of the coke oven system can suffer from similar thermal and/or structural limitations. For example, the crown of a sole flue running under the oven floor can collapse or otherwise suffer from heaving of the oven floor, ground settling, thermal or structural cycling, or other fatigue. These stresses can cause bricks in the sole flue to shift and drop out.

BRIEF DESCRIPTION OF THE DRAWINGS

FIG. 6 is a partial isometric view of a monolith crown floor and monolith sole flue portion of a horizontal heat recovery coke oven configured in accordance with embodiments of the technology.

DETAILED DESCRIPTION

The present technology is generally directed to horizontal heat recovery coke ovens having monolith component construction. In some embodiments, a HHR coke oven includes a monolith crown that spans the width of the oven between opposing oven sidewalls, a monolith wall that extends the height and length of the coke oven, and/or a monolith floor that extends the length and width of the coke oven. The monolith components expand upon heating and contracts upon cooling as a single structure. In further embodiments, the monolith components comprise a thermally-volume-stable material. In various embodiments, the monolith component and thermally-volume-stable features can be used in combination or alone. These designs can allow the oven to be turned down below traditionally-feasible temperatures while maintaining the structural integrity of the monolith components.

Specific details of several embodiments of the technology are described below with reference to FIGS. 1A-7. Other details describing well-known structures and systems often associated with coke ovens have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1A-7.

Figure 1A:
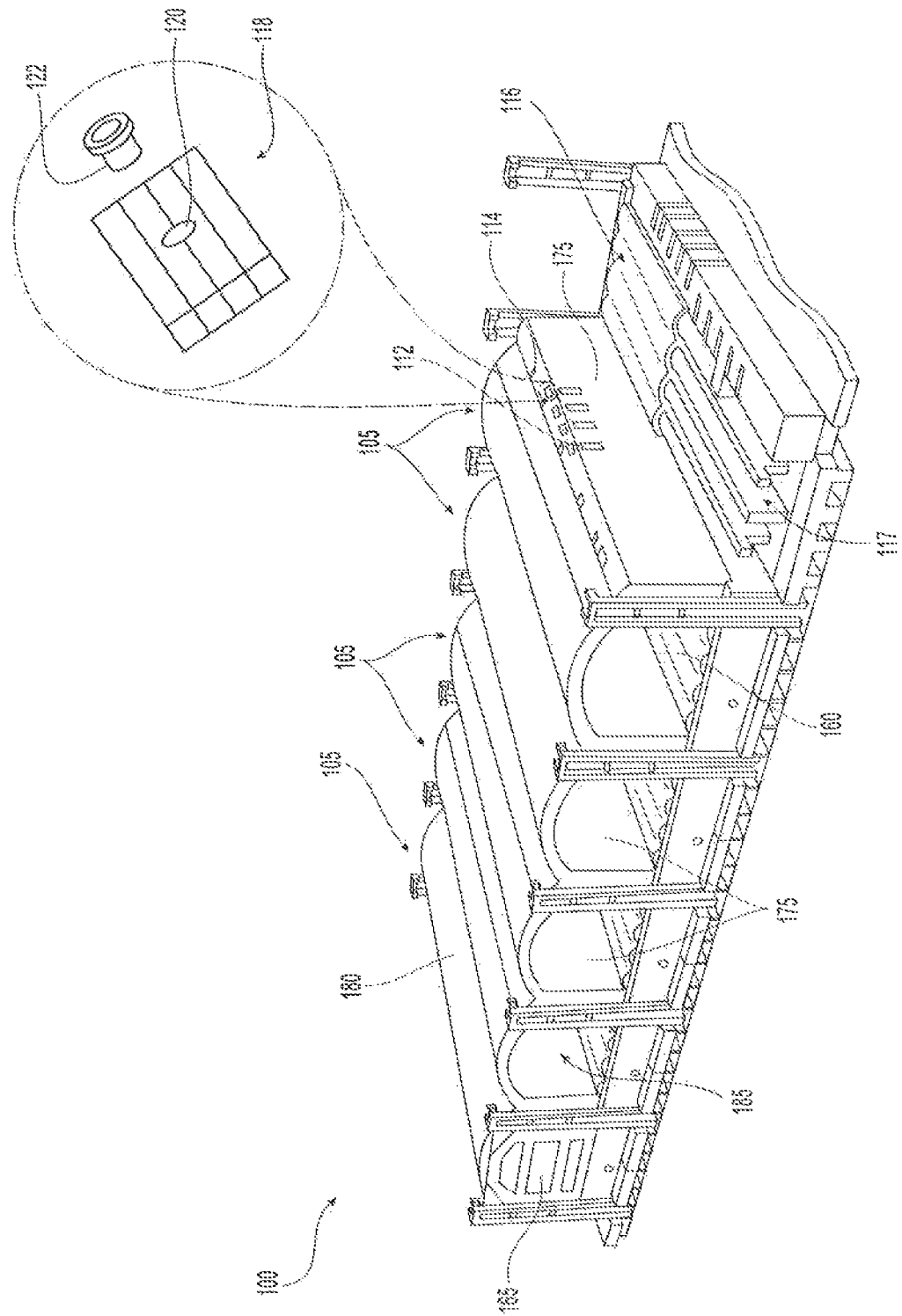
FIG. 1A is an isometric, partial cut-away view of a portion of a horizontal heat recovery coke plant configured in accordance with embodiments of the present technology.

FIG. 1A is an isometric, partial cut-away view of a portion of a horizontal heat recovery ("HHR") coke plant 100 configured in accordance with embodiments of the technology. The plant 100 includes a plurality of coke ovens 105. Each oven 105 can include an open cavity defined by a floor 160, a front door 165 forming substantially the entirety of one side of the oven, a rear door (not shown) opposite the front door 165 forming substantially the entirety of the side of the oven opposite the front door, two sidewalls 175 extending upwardly from the oven floor 160 intermediate the front door 165 and rear door, and a crown 180 that forms the top surface of the open cavity of an oven chamber 185. A first end of the crown 180 can rest on a first sidewall 175 while a second end of the crown 180 can rest on an opposing sidewall 175 as shown. Adjacent ovens 105 can share a common sidewall 175.

Figure 1B:
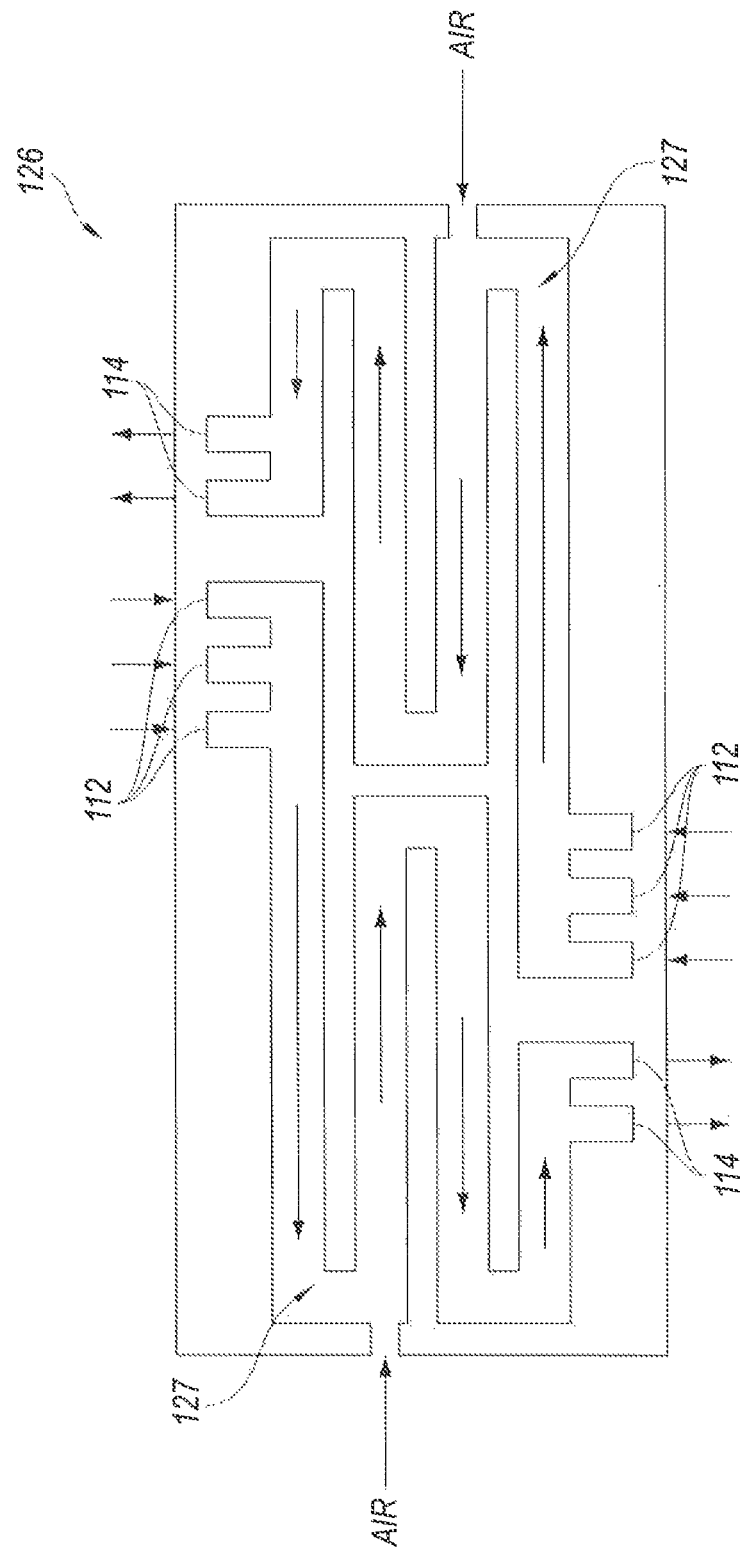
FIG. 1B is a top view of a sole flue portion of a horizontal heat recovery coke oven configured in accordance with embodiments of the technology.

In operation, volatile gases emitted from the coal positioned inside the oven chamber 185 collect in the crown 180 and are drawn downstream in the overall system into downcommer channels 112 formed in one or both sidewalls 175. The downcommer channels 112 fluidly connect the oven chamber 185 with a sole flue 116 positioned beneath the oven floor 160. The sole flue 116 includes a plurality of side-by-side runs 117 that form a circuitous path beneath the oven floor 160. While the runs 117 in FIG. 1A are shown to be substantially parallel to a longitudinal axis of the oven 105 (i.e., parallel to the sidewalls 175), in further embodiments, the sole flue 116 can be configured such that at least some segments of the runs 117 are generally perpendicular to the longitudinal axis of the oven 105 (i.e., perpendicular to the sidewalls 175), in still further embodiments, the sole flue 116 can be configured such that all or some of the runs 117 are nonperpendicular to the longitudinal axis and or are generally serpentine. This arrangement is illustrated in FIG. 1B and is discussed in further detail below. Volatile gases emitted from the coal can be combusted in the sole flue 116, thereby generating heat to support the reduction of coal into coke. The downcommer channels 112 are fluidly connected to chimneys or uptake channels 114 formed in one or both sidewalls 175.

From time to time, the downcommer channels 112 may require inspection or service to ensure that the oven chamber 185 remains in open fluid communication with the sole flue 116 positioned beneath the oven floor 160. Accordingly, in various embodiments, downcommer covers 118 are positioned over openings in the upper end portions of the individual downcommer channels 112. In some embodiments, the downcommer covers 118 may be provided as a single, plate structure. In other embodiments, such as depicted in FIG. 1A, the downcommer covers 118 may be formed from a plurality of separate cover members that are positioned closely adjacent, or secured with, one another. Certain embodiments of the downcommer covers 118 include one or more inspection openings 120 that penetrate central portions of the downcommer cover 118. While depicted as being round, it is contemplated that the inspection openings 120 may be formed to be nearly any curvilinear, or polygonal shape, desired for the particular application. Plugs 122 are provided to have shapes that approximate those of the inspection openings 120. Accordingly, the plugs 122 may be removed for visual inspection or repair of the downcommer channels 112 and returned in order to limit the unintentional escape of volatile gases. In additional embodiments a liner may extend the full length of the channel to interface with the inspection opening. In alternative embodiments, the liner may extend only a portion of the channel length.

Coke is produced in the ovens 105 by first loading coal into the oven chamber 185, heating the coal in an oxygen-depleted environment, driving off the volatile fraction of coal, and then oxidizing the VM within the oven 105 to capture and utilize the heat given off. The coal volatiles are oxidized within the ovens 105 over an extended coking cycle and release heat to regeneratively drive the carbonization of the coal to coke. The coking cycle begins when the front door 165 is opened and coal is charged onto the oven floor 160. The coal on the oven floor 160 is known as the coal bed. Heat from the oven (due to the previous coking cycle) starts the carbonization cycle. Roughly half of the total heat transfer to the coal bed is radiated down onto the top surface of the coal bed from the luminous flame of the coal bed and the radiant oven crown 180. The remaining half of the heat is transferred to the coal bed by conduction from the oven floor 160, which is convectively heated from the volatilisation of gases in the sole flue 116. In this way, a carbonization process "wave" of plastic flow of the coal particles and formation of high strength cohesive coke proceeds from both the top and bottom boundaries of the coal bed.

Typically, each oven 105 is operated at negative pressure so air is drawn into the oven during the reduction process due to the pressure differential between the oven 105 and the atmosphere. Primary air for combustion is added to the oven chamber 185 to partially oxidize the coal volatiles, but the amount of this primary air is controlled so that only a portion of the volatiles released from the coal are combusted in the oven chamber 185, thereby releasing only a fraction of their enthalpy of combustion within the oven chamber 185. The primary air is introduced into the oven chamber 185 above the coal bed. The partially combusted gases pass from the oven chamber 185 through the downcommer channels 112 into the sole flue 116 where secondary air is added to the partially combusted gases. As the secondary air is introduced, the partially combusted gases are more fully combusted in the sole flue 116, thereby extracting the remaining enthalpy of combustion, which is conveyed through the oven floor 160 to add heat to the oven chamber 185. The fully or nearly fully combusted exhaust gases exit the sole flue 116 through the uptake channels 114. At the end of the coking cycle, the coal has coked out and has carbonized to produce coke. The coke can be removed from the oven 105 through the rear door utilizing a mechanical extraction system. Finally, the coke is quenched (e.g., wet or dry quenched) and sized before delivery to a user.

Figure 3:
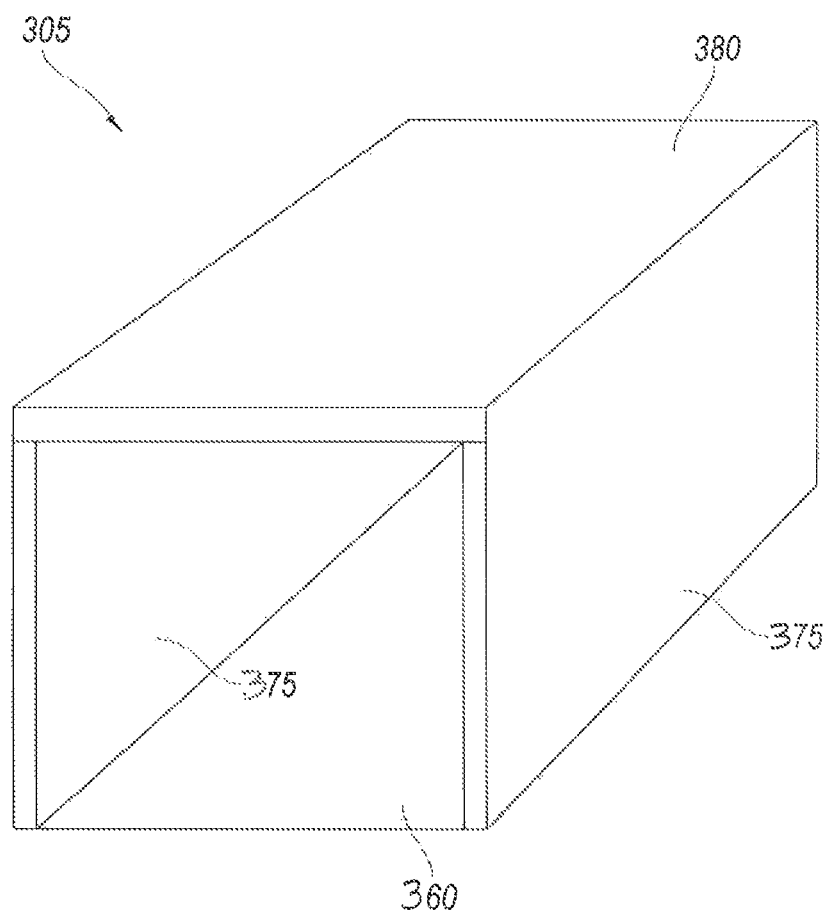
FIG. 3 is an isometric view of a coke oven having a monolith crown configured in accordance with further embodiments of the technology.
Figure 4A:
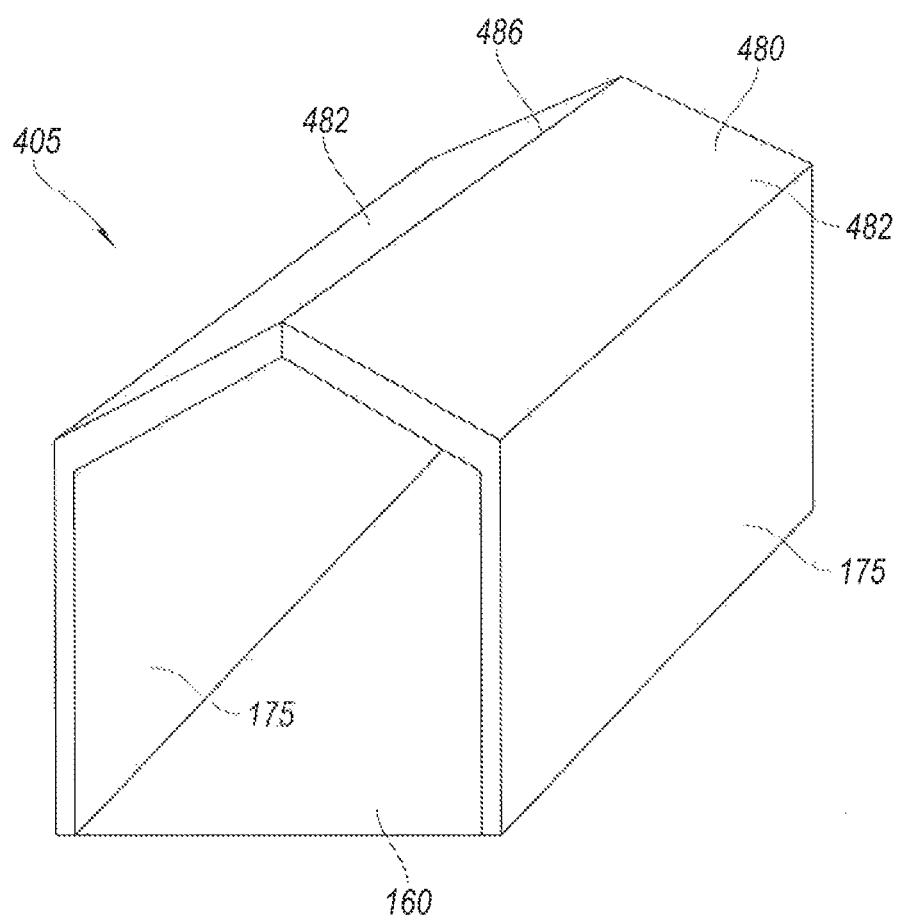
FIG. 4A is an isometric view of a coke oven having a monolith crown configured in accordance with still further embodiments of the technology.

As will be discussed in further detail below with reference to FIGS. 2A-4B, in several embodiments, the crown 180, the floor 160, and/or the sidewalls 175 comprise a monolith element structure or precast shape. The monolith crown 160 is configured to span all or a portion of the distance between the monolith sidewalls 175 and/or including the monolith sidewalls. In further embodiments, the monolith crown can include some or all of the monolith sidewalls 175 on one or both sides of the monolith crown. In still further embodiments, the monolith floor 160 can include some or all of the monolith sidewalk 175 on one or both sides of the monolith crown 160. For example, the monolith crown 180 can comprise a single segment that spans between the sidewalls 175 or can comprise two, three, four, or more segments that meet between the sidewalk 175 and in combination span between the sidewalls 175, or can comprise a monolith crown with integral monolith sidewalk 175. Similarly, for example, the monolith floor 160 can comprise a single segment that spans between the sidewalls 175 or can comprise two, three, four, or more segments that meet between the sidewalk 175 and in combination span between the sidewalls 175, or can comprise a monolith floor with integral monolith sidewalls 175. In still further embodiments, the monolith crown 160, the monolith sidewalls 175, and the monolith floor 160 may form one monolith structure and may be cast in place or may be pre-cast and then moved into place. The monolith structure enables the crown 180 to expand upon oven heating and retract upon cooling without allowing individual bricks to contract and fall into the oven chamber 185, causing the monolith crown 180 to collapse. The monolith crown 180 can accordingly allow the oven 105 to be shut down or turned down below traditionally feasible temperatures for a given crown material. As discussed above, some materials, like silica, become generally thermally-volume-stable above certain temperatures (i.e., around 1,200° F. for silica). Using a monolith crown 180, a silica brick oven can be turned down below 1,200° F. Other materials, such as alumina, have no thermally-volume-stable upper limit (i.e., remain volume-unstable or expandable), and the monolith crown 180 allows for the use of these materials without collapse from cooling contraction. In other embodiments, other materials or combinations of materials can be used for the monolith crown, with different materials having different associated thermally-volume-stable temperatures. Further, the monolith crown 180 can be quickly installed, as the whole arch can be lifted and placed as a single structure. Further, by using monolith segments instead of numerous individual bricks, the monolith crown 180 can be built in shapes different from the traditional arch—such as a flat or straight-edged shape. Some of these designs are shown in FIGS. 3 and 4A. In various embodiments, the monolith crown 180 can be precast or pre-formed or formed on site. The monolith crown 180 can have various widths (i.e., from sidewall-to-sidewall) in different embodiments or can include the sidewall in alternative embodiments. In some embodiments, the monolith crown 180 width is about 3 feet or greater, while in particular embodiments, the width is 12-15 feet. In other embodiments, the precast shape used in the coke oven in accordance with this disclosure is of various complex geometrical shapes, including all three dimensional shapes with the express exclusion of a simple brick shape.

In some embodiments, the monolith crown 180 is at least partially made of a thermally-volume-stable material such that upon heating or cooling the oven chamber 185, the monolith crown 180 does not adjust in position. As with an overall monolith oven design, a monolith crown 180 made of a thermally-volume-stable material allows the oven 105 to be shut down or turned down without individual bricks in the crown 180 contracting and collapsing into the oven chamber 185. While the term "thermally-volume-stable material" is used herein, this term can refer to materials that are zero-expansion, zero-contraction, near-zero-expansion, and/or near-zero-contraction, or a combination of these characteristics, upon heating and/or cooling. In some embodiments, the thermally-volume-stable materials can be precast or pre-fabricated into designed shapes, including as individual shapes or monolith segments. Further, in some embodiments, the thermally-volume-stable materials can be repeatedly heated and cooled without affecting the expandability characteristics of the material, while in other embodiments the material can be heated and/or cooled only once before undergoing a phase or material change that affects subsequent expandability characteristics. In a particular embodiment, the thermally-volume-stable material is a fused silica material, zirconia, refractory material, or a ceramic material. In further embodiments, other portions of the oven 105 additionally or alternately can be formed of thermally-volume-stable materials. For example, in some embodiments, the lintel for the door 165 comprises such a material. When using thermally-volume-stable materials, traditional-sized bricks or a monolith structure can be used as the crown 180.

In some embodiments, the monolith or thermally-volume-stable designs can be used at other points in the plant 100, such as over the sole flue 116, as part of the oven floor 160 or sidewalls 175, or other portions of the oven 105. In any of these locations, the monolith or thermally-volume-stable embodiments can be used as an individual structure or as a combination of sections. For example, a crown 180 or oven floor 160 can comprise one monolith component, multiple monolith segments and/or multiple segments made of thermally-volume-stable material. In another embodiment, as shown in FIG. 1A, a monolith segment over the sole flue 116 comprises a plurality of side-by-side arches, each arch covering a run 117 of the sole flue 116. Since the arches comprise a single structure, they can expand and contract as a single unit. In further embodiments (as will be discussed in further detail below), the crown of the sole flue can comprise other shapes, such as a flat top and such other shapes may be a single monolith segment or a plurality of monolith segments. In still further embodiments, the monolith sole flue crown comprises individual monolith segments (e.g., individual arches or flat portions) that each span only one run 117 of the sole flue 116.

FIG. 1B is a top view of a monolith sole flue 126 of a horizontal heat recovery coke oven configured in accordance with embodiments of the technology. The monolith sole flue 126 has several features generally similar to the monolith sole flue 116 described above with reference to FIG. 1A. For example, the monolith sole flue includes a serpentine or labyrinth pattern of runs 127 configured for communication with a coke oven (e.g., the coke oven 105 of FIG. 1A) via the downcommer channels 112 and uptake channels 114. Volatile gases emitted from the coal positioned inside a coke oven chamber are drawn downstream into the downcommer channels 112 and into the sole flue 126. Volatile gases emitted from the coal can be combusted in the sole flue 126, thereby generating heat to support the reduction of coal into coke. The downcommer channels 112 are fluidly connected to chimneys or uptake channels 114, which draw fully or nearly fully combusted exhaust gases from the sole flue 126.

In FIG. 1B, at least some segments of the runs 127 are generally perpendicular to the longitudinal axis of the oven 105 (i.e., perpendicular to the sidewalls 175 shown in FIG. 1A). Alternatively, the sole flue pathway may be serpentine or may include directional flow baffles. In still further embodiments, the sole flue 126 may be a single monolith segment or multiple monolith segments adjacent to and/or interlocked together. As with the monolith sole flue 116, shown in FIG. 1A, the monolith sole flue 126 of FIG. 1B can include a monolith crown portion that spans individual runs 127 or a plurality of runs 127. The monolith sole flue crown can comprise a flat monolith segment, a single monolith arch, a plurality of adjacent monolith arches, a combination of these monolith shapes, or other monolith shapes. Further, the monolith sole flue crown can span and/or follow the turns or curves of the sole flue serpentine pathway of runs 127.

Figure 1C:
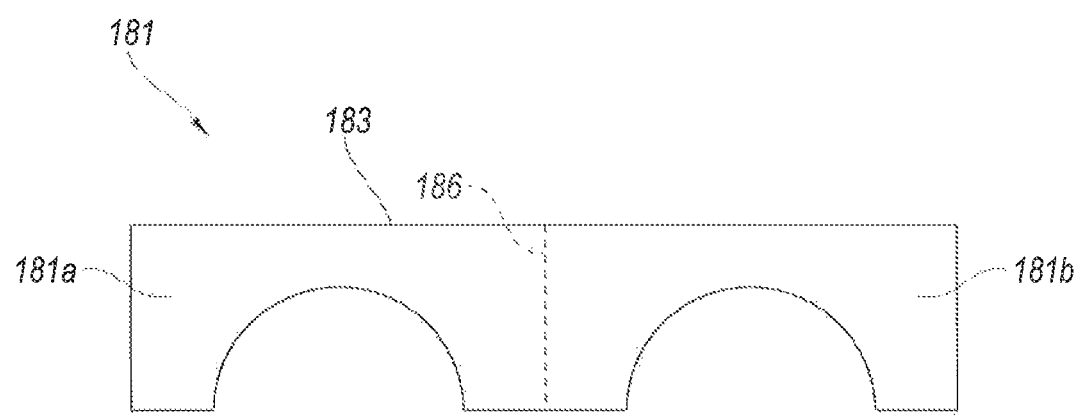
FIG. 1C is a front view of a monolith crown for use with the sole flue shown in FIG. 1B and configured in accordance with embodiments of the technology.

FIG. 1C is a front view of a monolith crown 181 for use with the monolith sole flue 126 shown in FIG. 1B and configured in accordance with embodiments of the technology. In the illustrated embodiment, the monolith crown 181 comprises a plurality of adjacent arched portions 181a, 181b having a flat top 183. Each portion 181a, 181b can be used as a monolith crown for an individual run in the sole flue 126. Further, the flat monolith top 183 can comprise a monolith floor or subfloor for the oven chamber 185 described above with reference to FIG. 1A. In some embodiments, a layer of bricks can be placed on top of the flat monolith top 183.

In various embodiments, the monolith crown 181 can comprise a single monolith segment or a plurality of individual segments (e.g., the individual arched portions 181a, 181b) that are separated by an optional joint 186 shown in broken line. Accordingly, a single monolith crown 181 can cover one run or a plurality of adjacent runs in the monolith sole flue 126. As mentioned above, in further embodiments, the monolith crown 181 can have shapes other than an arched underside with a flat top. For example, the crown 181 can be entirely flat, entirely arched or curved, or other combinations of these characteristics. While the monolith crown 181 has been described for use with the monolith sole flue 126 of FIG. 1B, it could similarly be used with the sole flue 116 or coking chamber 185 shown in FIG. 1A.

Figure 2A:
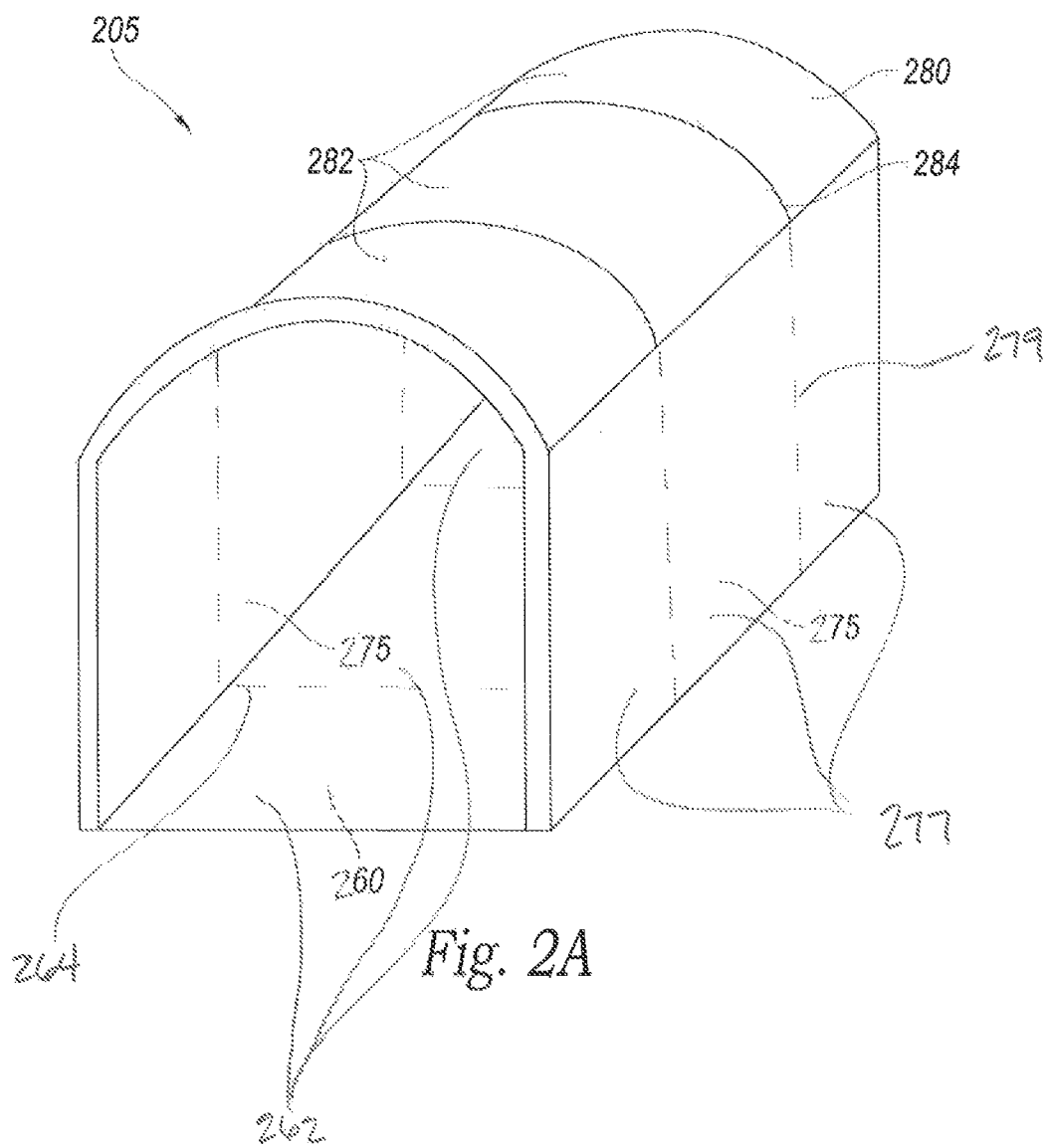
FIG. 2A is an isometric view of a coke oven having a monolith crown configured in accordance with embodiments of the technology.

FIG. 2A is an isometric view of a coke oven 205 having a monolith crown 280, monolith walls 275 and monolith floor 260 configured in accordance with embodiments of the technology. The oven 205 is generally similar to the oven 105 described above with reference to FIG. 1. For example, the oven 205 includes the monolith oven floor 260 and opposing monolith sidewalls 275. The monolith crown 280 comprises a monolith structure, wherein the monolith crown 280 extends between the monolith sidewalls 275 and/or the monolith crown 280 and sidewalls 275 are one monolith structure. In the illustrated embodiment, the monolith crown 280 comprises a plurality of monolith crown segments 282 generally adjacent to one another and aligned along the length of the oven 205 between the front and back of the oven 205. While three segments 282 are illustrated, in further embodiments, there can be more or fewer segments 282. In still further embodiments, the crown 280 comprises a single monolith structure extending from the front of the oven 205 to the back. In some embodiments, multiple segments 282 are used to ease construction. The individual segments can meet joints 284. In some embodiments, the joints 284 are filled with refractory material, such as refractory blanket, mortar, or other suitable material, to prevent air in-leakage and unintentional exhaust. In still further embodiments, as will be discussed with reference to FIG. 4 below, the monolith crown 280 can comprise multiple lateral segments between the sidewalls 275 that meet or join over the oven floor 260 to form a monolith structure.

The monolith sidewalk 275 comprise a monolith structure, wherein the monolith sidewalk 275 extend from the monolith floor 260 to the monolith crown 280 as one monolith structure. In the illustrated embodiment, the monolith sidewalls 275 comprise a plurality of monolith wall segments 277 generally adjacent to one another and aligned along the length of the oven 205 between the front and back of the oven 205. While three segments 277 are illustrated, in further embodiments, there can be more or fewer segments 277. In still further embodiments, the walls 275 comprises a single monolith structure extending from the front of the oven 205 to the back. In some embodiments, multiple segments 277 are used to ease construction. The individual segments can meet joints 279. In some embodiments, the joints 279 are filled with refractory material, such as refractory blanket, mortar, or other suitable material, to prevent air in-leakage and unintentional exhaust. In still further embodiments, as will be discussed with reference to FIG. 4 below, the monolith walls 275 can comprise multiple lateral segments between the monolith crown 280 and the oven floor 260 to form a monolith structure.

The monolith floor 260 comprises a monolith structure, wherein the monolith floor 260 extends between the monolith sidewalk 275 and/or the monolith floor 260 and sidewalls 275 are one monolith structure. In the illustrated embodiment, the monolith floor 260 comprises a plurality of monolith floor segments 262 generally adjacent to one another and aligned along the length of the oven 205 between the front and back of the oven 205. While three segments 262 are illustrated, in further embodiments, there can be more or fewer segments 262. In still further embodiments, the monolith floor 260 comprises a single monolith structure extending from the front of the oven 205 to the back. In some embodiments, multiple segments 262 are used to ease construction. The individual segments can meet joints 264. In some embodiments, the joints 264 are filled with refractory material, such as refractory blanket, mortar, or other suitable material, to prevent air in-leakage and unintentional exhaust. In still further embodiments, as will be discussed with reference to FIG. 4 below, the monolith floor 260 can comprise multiple lateral segments between the sidewalls 275 that meet or join under the monolith crown 280 to form a monolith structure.

Figure 2B:
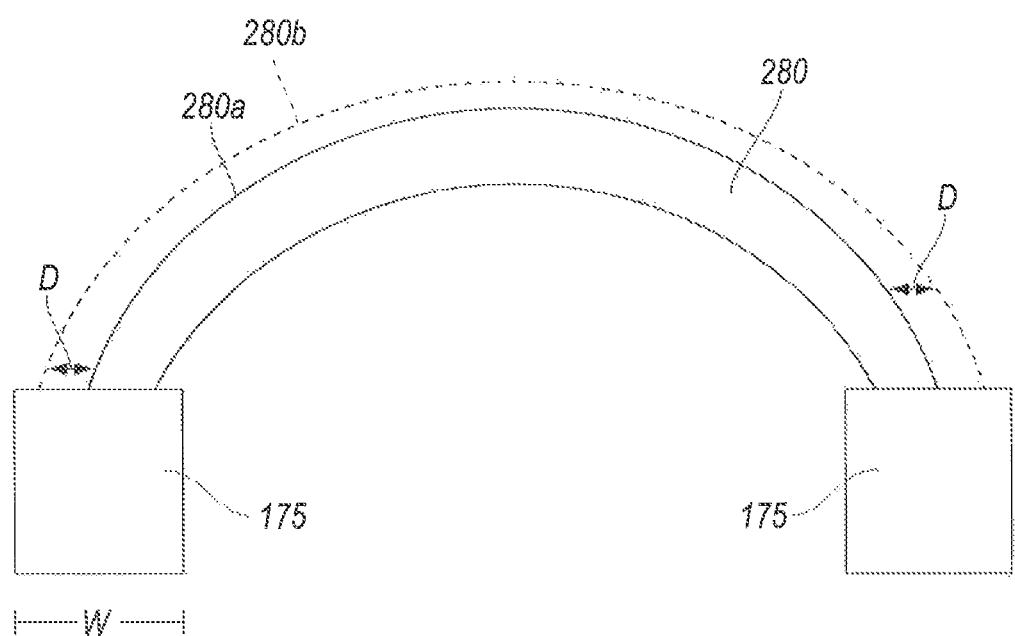
FIG. 2B is a front view of the monolith crown of FIG. 2A moving between a contracted configuration and an expanded configuration in accordance with embodiments of the technology.

FIG. 2B is a front view of the monolith crown 280 of FIG. 2A moving between a contracted configuration 280a and an expanded configuration 280b in accordance with embodiments of the technology. As discussed above, traditional crown materials expand upon oven heating and contract upon cooling. This retraction can create space between individual oven bricks and cause bricks in the crown to collapse into the oven chamber. Using monolith segments, for example, a monolith crown, however, the monolith crown 280 expands and contracts as a single structure and does not collapse upon cooling. Similarly, monolith floor 260, monolith walls 275, or combined monolith segments will expand and contract as a single structure.

The design of the oven 205 provides structural support for such expansion and contraction between monolith shapes or structures upon heating and cooling. More specifically, the monolith sidewalls 275 that support the monolith crown 280 can have a width W that is sufficiently greater than the width of the monolith crown 280 to fully support the monolith crown 280 as the monolith crown 280 moves laterally between the contracted 280a and expanded 280b configurations. For example, the width W can be at least the width of the monolith crown 280 plus the distance D of expansion. Therefore, when the monolith crown 280 expands or is translated laterally outward upon heating, and contracts and translates laterally inward again upon cooling, the monolith sidewalls 275 maintain support of the monolith crown 280. The monolith crown 280 can likewise expand or translate longitudinally outward upon heating, and contract and translate longitudinally inward upon cooling. The front and back walls (or door frames) of the oven 205 can accordingly be sized to accommodate this shifting.

In further embodiments, the monolith crown 280 can rest on a crown footing other than directly on the monolith sidewalls 275. Such a footing can be coupled to or be an independent structure of the sidewalls 275. In still further embodiments, the entire oven may be made of expanding and contracting material and can expand and contract with the crown 280, and may not require sidewalls having a width as large as the width W shown in FIG. 2B because the monolith crown 280 stays generally aligned with the expanding monolith sidewalls 275 upon heating and cooling. Similarly, if both the monolith crown 280 and monolith sidewalls 275 are made of a thermally-volume-stable material, then the monolith sidewalls 275 can stay generally aligned with the monolith crown 280 upon heating and cooling, and the monolith sidewalls 275 need not be substantially wider (or even as wide) as the monolith crown 280. In some embodiments, the sidewalls 275 (monolith or brick), front or back door frames, and/or crown 280 can be retained in place via a compression or tension system, such as a spring-load system. In a particular embodiment, the compression system can include one or more buckstays on an exterior portion of the sidewalk 275 and configured to inhibit the sidewalls 275 from outward movement. In further embodiments, such a compression system is absent.

Figure 2C:
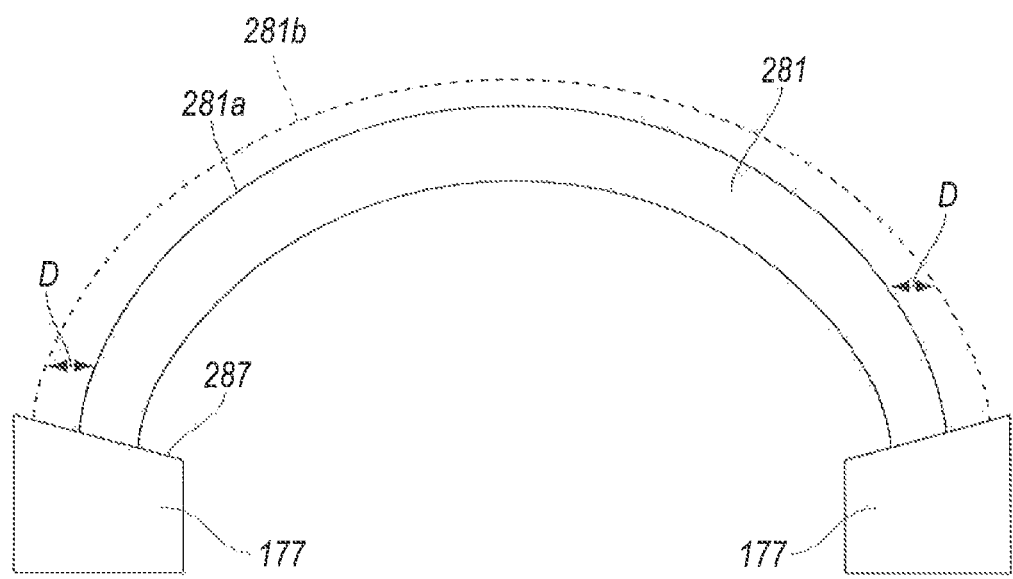
FIG. 2C is a front view of oven sidewalls for supporting a monolith crown configured in accordance with further embodiments of the technology.

FIG. 2C is a front view of oven monolith sidewalk 177 for supporting a monolith crown 281 configured in accordance with further embodiments of the technology. The monolith sidewalls 177 and monolith crown 281 are generally similar to the monolith sidewalk 175 and monolith crown 280 shown in FIG. 2B. In the embodiment shown in FIG. 2C, however, the monolith sidewalls 177 and monolith crown 281 have an angled or slanted interface 287. Thus, when the monolith crown 281 expands distance D upon heating (i.e., translates from position 281a to position 281b), the monolith crown 281 translates along the slanted surface of the top of the monolith sidewall 177 following the pattern of the interface 287. Similarly, when the monolith sidewall 177 expands upon heating in height H, the monolith crown 281 translates along the slanted surface of the top of the monolith sidewall 177 following the pattern of the interface 287 and accommodating for differential thermal expansion.

Figure 2D:
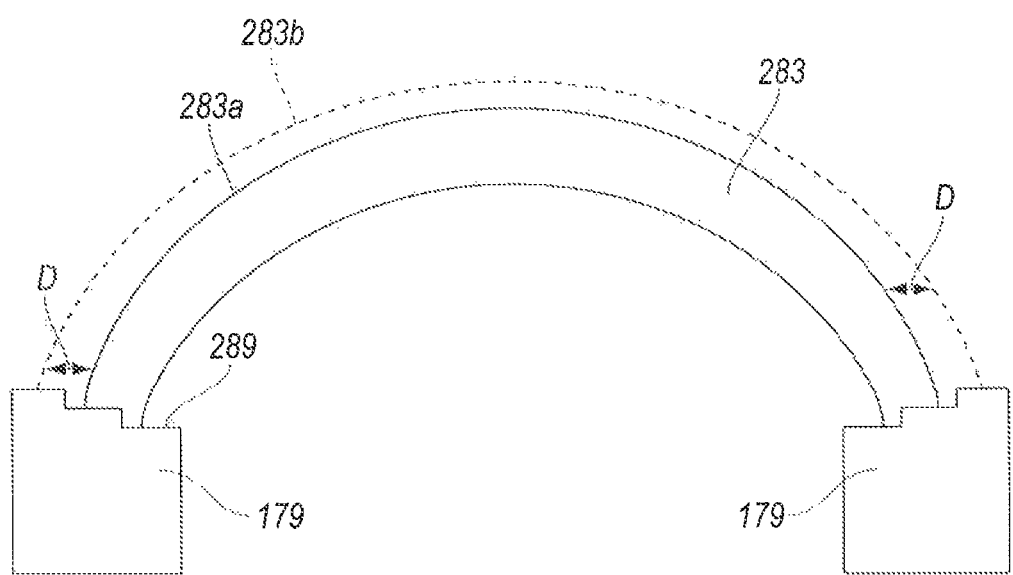
FIG. 2D is a front view of oven sidewalls for supporting a monolith crown configured in accordance with further embodiments of the technology.

In other embodiments, the monolith crown 281 and monolith sidewalls 177 can interface in other patterns, such as recesses, slots, overlapping portions, and/or interlocking features. For example, FIG. 2D is a front view of oven monolith sidewalls 179 for supporting a monolith crown 283 configured in accordance with further embodiments of the technology. The monolith sidewalls 179 and monolith crown 283 are generally similar to the monolith sidewalk 175 and monolith crown 280 shown in FIG. 2B. In the embodiment shown in FIG. 2D, however, the monolith sidewalk 179 and monolith crown 283 have a stepped or zigzag interface 289. Thus, when the monolith crown 283 expands distance D upon heating (i.e., translates from position 283a to position 283b), the monolith crown 283 translates along the stepped surface of the top of the monolith sidewall 179 following the pattern of the interface 289.

Similarly, in other embodiments, the monolith floor and monolith sidewalls can interface in similar patterns, such as recesses, slots, overlapping portions, and/or interlocking features. For example, the monolith sidewalls may be supported by the monolith floor configured in accordance with further embodiments of the technology. The monolith sidewalk and monolith floor are generally similar to the monolith sidewalls 175 and monolith floor 260 shown in FIG. 2B. However, the monolith sidewalk and monolith floor may have a stepped or zigzag interface similar to the monolith sidewalls and monolith crown interface shown in the embodiment shown in FIG. 2D. In still further embodiments, monolith components can include a variety of indent/detent, tongue and groove, angled or similar interfaces. Still other interface patterns include recesses, slots, overlapping portions, and/or interlocking features.

FIG. 3 is an isometric view of a coke oven 305 having a monolith crown 380 configured in accordance with further embodiments of the technology. Because the monolith crown 380 is preformed, it can take on shapes other than the traditional arch. In the illustrated embodiment, for example, the monolith crown 380 comprises a generally flat surface. This design can provide for minimal material costs. In other embodiments, other monolith crown shapes can be employed to improve gas distribution in the oven 305, to minimize material costs, or for other efficiency factors. Further, as shown in FIG. 3, the monolith crown 380, monolith floors 360, and monolith walls 375 may combine to form a monolith structure or a monolith coke oven.

FIG. 4A is an isometric view of a coke oven 405 having a monolith crown 480 configured in accordance with other embodiments of the technology. The crown 405 comprises a plurality (e.g., two) monolith portions 482 that meet at a joint 486 over the oven floor 160. The joint 486 can be sealed and/or insulated with any suitable refractory material if necessary. In various embodiments, the joint(s) 486 can be centered on the crown 480 or can be off-center. The monolith portions 482 can be the same size or a variety of sizes. The monolith portions 482 can be generally horizontal or angled (as shown) relative to the oven floor 160. The angle can be selected to optimize air distribution in the oven chamber. There can be more or fewer monolith portions 482 in further embodiments. Further, the monolith crown, monolith floors, and monolith walls may combine to form a monolith structure or a monolith coke oven.

Figure 4B:
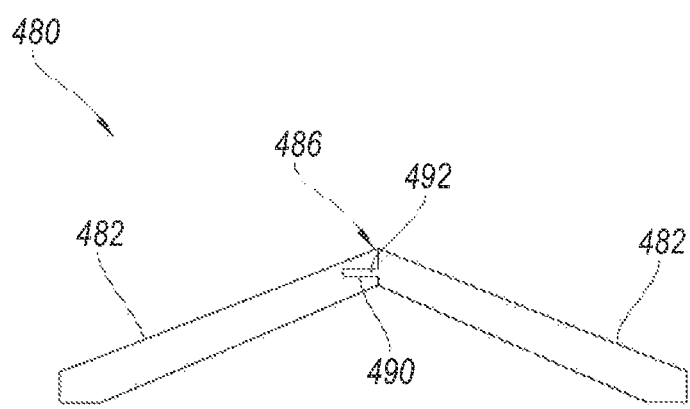
FIG. 4B is a front view of the monolith crown of FIG. 4A configured in accordance with further embodiments of the technology.

FIG. 4B is a front view of the monolith crown 480 of FIG. 4A configured in accordance with further embodiments of the technology. As shown in FIG. 4B, the monolith portions 482 can include an interfacing feature at the joint 486 to better secure the monolith portions 482 to one another. For example, in the illustrated embodiment, the joint 486 comprises a pin 492 on one monolith portion 482 configured to slide into and interface with a slot 490 on the adjacent monolith portion 482. In further embodiments, the joint 486 can comprise other recesses, slots, overlapping features, interlocking features, or other types of interfaces. In still further embodiments, mortar is used to seal or fill the joint 486. In still further embodiments, the monolith crown, monolith floors, and monolith walls may combine to form a monolith structure or a monolith coke oven.

While the illustrated interfacing feature is along a joint 486 that is generally parallel to the sidewalls 175, in further embodiments, the interfacing feature can be used at a joint that is generally perpendicular to the sidewalls 175. For example, any of the interfacing features described above could be used at the joints 284 between the crown segments 282 of FIG. 2A. Thus, the interfacing features can be used at any joint in the crown 480, regardless of whether monolith portions are orientated side-to-side or front-to-back over the oven floor. In accordance with aspects of the disclosure, the crown or precast section may be an oven crown, an upcommer arch, a downcommer arch, a J-piece, a single sole flue arch or multiple sole flue arches, a downcommer cleanout, curvilinear corner sections, and/or combined portions of any of the above sections. In some embodiments, the monolith crown is formed at least in part with a thermally-volume-stable material. In further embodiments, the monolith crown is formed as a monolith or several monolith segments spanning between supports such as oven sidewalls. In still further embodiments, the monolith crown is formed to span multiple ovens. In still further embodiments, the monolith crown includes integral monolith sidewalls.

Figure 5A:
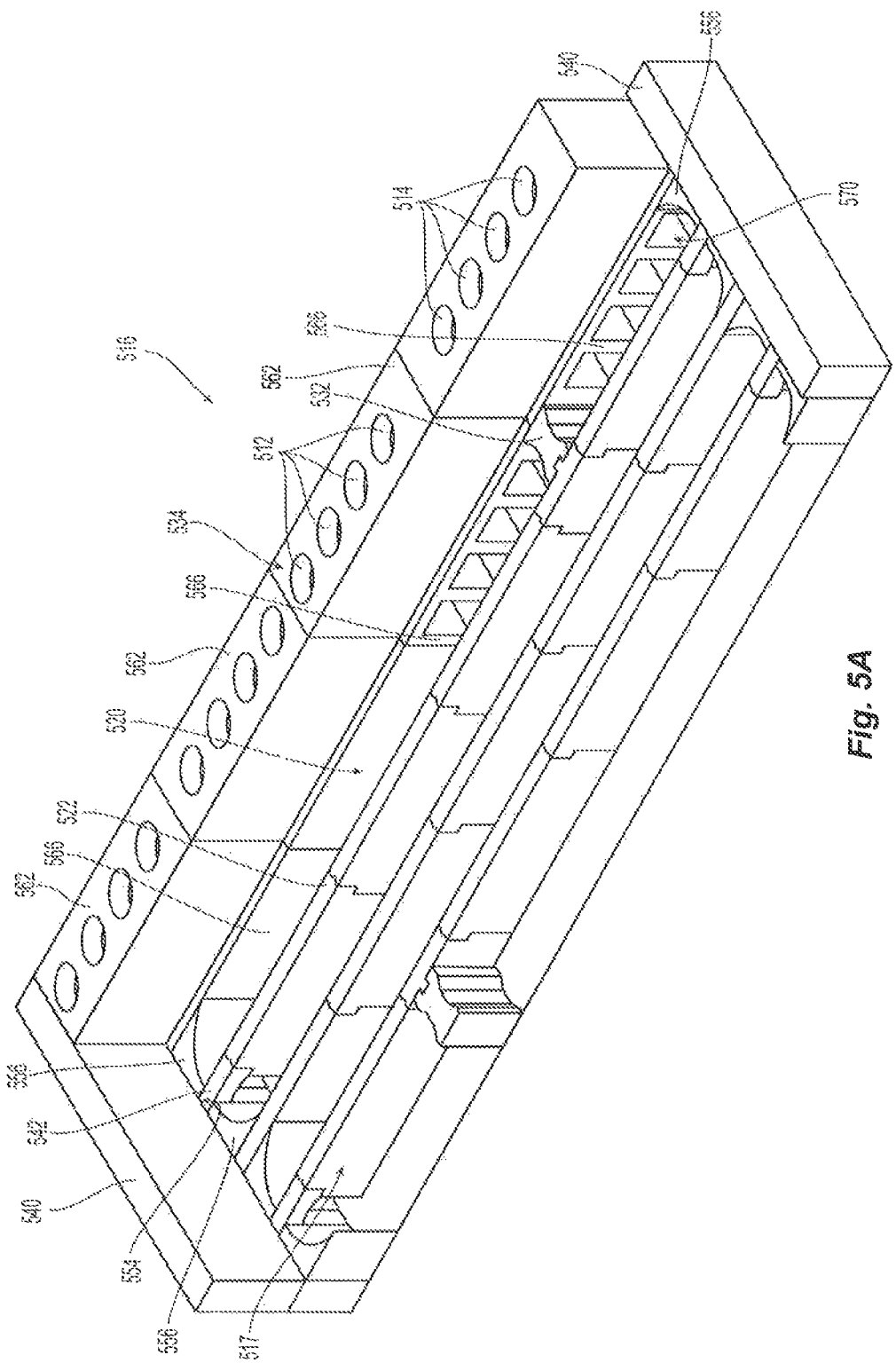
FIG. 5A is an isometric, partial cut-away view of a monolith sole flue portion of a horizontal heat recovery coke oven configured in accordance with embodiments of the technology.

FIG. 5A depicts a partial, cut-away view of a monolith sole flue 516 portion of a horizontal heat recovery coke oven configured in accordance with embodiments of the technology. The downcommer channels 112 fluidly connect the oven chamber 185 with the monolith sole flue 516. The monolith sole flue 516 includes a plurality of side-by-side runs 517 beneath the oven floor. As discussed with respect to the oven 105, the runs 517 in FIG. 5A are shown to be substantially parallel to a longitudinal axis of the oven. However, in other embodiments, the monolith sole flue 516 can be configured such that at least some segments of the runs 517 are generally perpendicular to the longitudinal axis of the oven. In still further embodiments, the monolith sole flue can be configured such that at least some segments of the funs 517 are nonperpendicular or are serpentine.

Figure 5B:
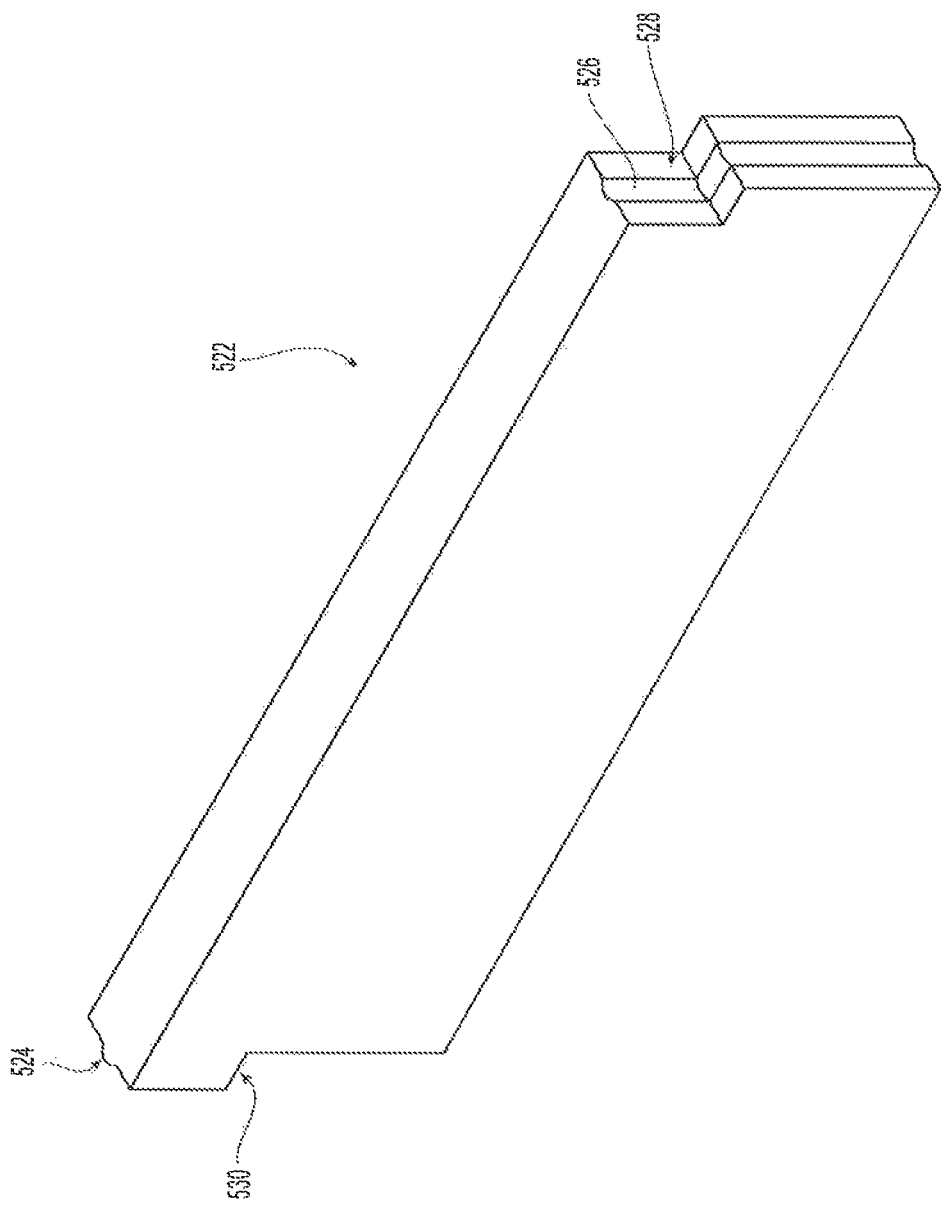
FIG. 5B is an isometric view of a section of a monolith sole flue wall for use with the monolith sole flue shown in FIG. 5A and configured in accordance with embodiments of the technology.
Figure 5D:
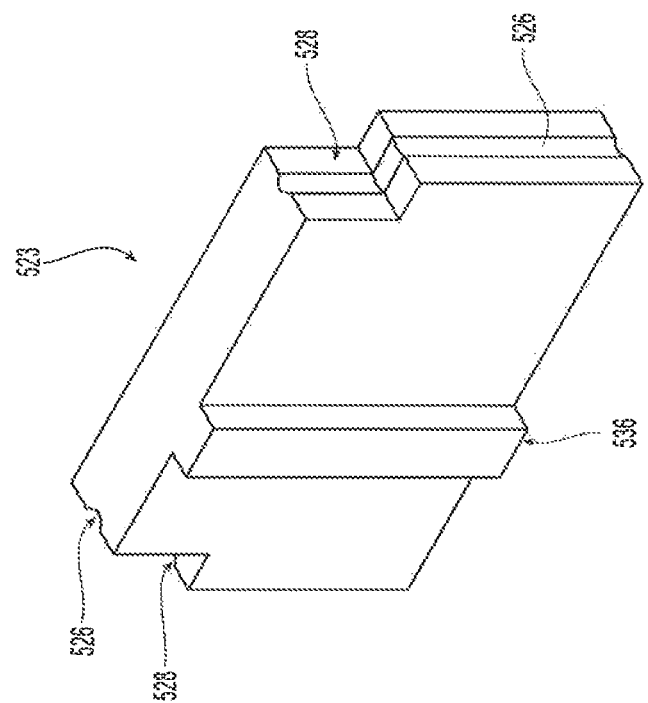
FIG. 5D is an isometric view of another section of monolith sole flue wall for use with the monolith sole flue shown in FIG. 5A and configured in accordance with embodiments of the technology.
Figure 5C:
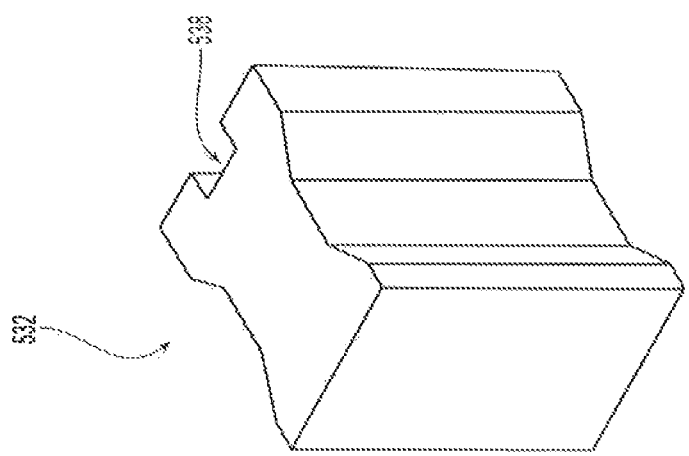
FIG. 5C is an isometric view of a blocking wall section for use with the monolith sole flue shown in FIG. 5A and configured in accordance with embodiments of the technology.

The runs 517 are separated by monolith sole flue walls 520. While it is contemplated that the monolith sole flue walls 520 could be formed in a one-piece construction, such as a single casting or cast-in-place unit. However, in other embodiments, a plurality of monolith sole flue wall segments 522 couple with one another to define the individual monolith sole flue walls 520. With reference to FIGS. 5B and 5D, the individual monolith sole flue wall segments 522 may be provided with a ridge 524, extending outwardly in a vertical fashion from one end. Similarly, the monolith sole flue wall segments 522 may include a groove 526 that extends inwardly in a vertical fashion at the opposite end. In this manner, opposing monolith sole flue wall segments 522 may be positioned closely adjacent one another so that the ridge 524 of one monolith sole flue wall segment 522 is disposed within the groove 526 of the adjacent monolith sole flue wall segment 522. In addition to, or in place of, the mating ridge 524 and groove 526, the monolith sole flue wall segments 522 may be provided with a notch 528 at one end and a projection 530 that extends from the opposite end. The notch 528 and projection 530 are shaped and positioned so that one sole monolith flue wall segment 522 may couple with an adjacent monolith sole flue wall segment 522 through the interlocking of the notch 528 and the projection 530. As will be appreciated by one skilled in the art, alternative geometric, reciprocating or locking systems are contemplated within the scope of this disclosure.

Volatile gases emitted from the coal in the oven are directed to the sole flue 516 through downcommer channels 512, which are fluidly connected to chimneys or uptake channels 514 by the sole flue 516. The volatile gases are directed along a circuitous path along the sole flue 516. With reference to FIG. 5A, the volatile gases exit the downcommer channels 512 and are directed along a fluid pathway through the runs 517. In particular, blocking wall section 532 is positioned to extend transversely between the sole flue wall 520 and the outer sole flue wall 534, between the downcommer channels 512 and the uptake channels 514. In at least one embodiment, a sole flue wall segment 523 includes a ridge 536 that extends outwardly in a vertical fashion from the sole flue wall segment 523. One end of the blocking wall section 532 includes a groove 538 that extends inwardly in a vertical fashion. In this manner, the sole flue wall segment 523 may be positioned closely adjacent the blocking wall section 532 so that the ridge 536 is disposed within the groove 538 to secure the position of the opposing structures with one another. In this manner, the volatile gases are substantially prevented from short circuiting the fluid pathway from the downcommer channels 512 and the uptake channels 514.

Figure 5E:
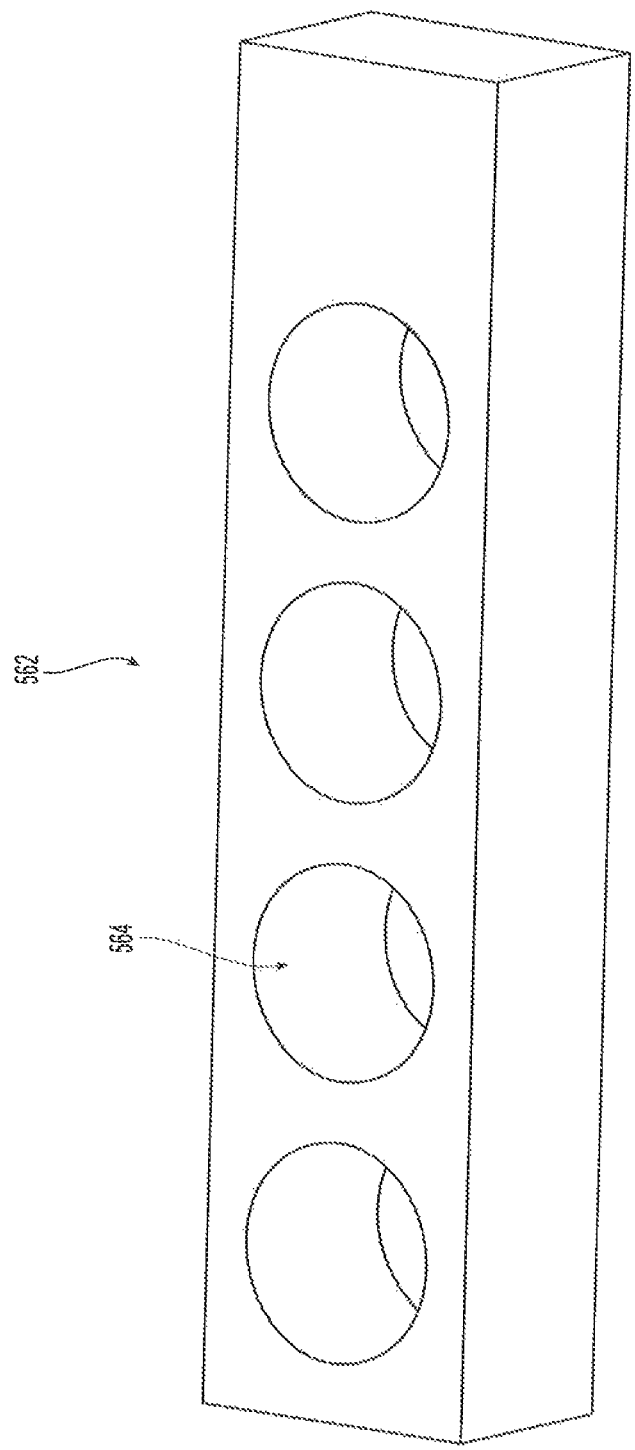
FIG. 5E is an isometric view of a monolith outer sole flue wall section with fluid channels for use with the monolith sole flue shown in FIG. 5A and configured in accordance with embodiments of the technology.
Figure 5F:
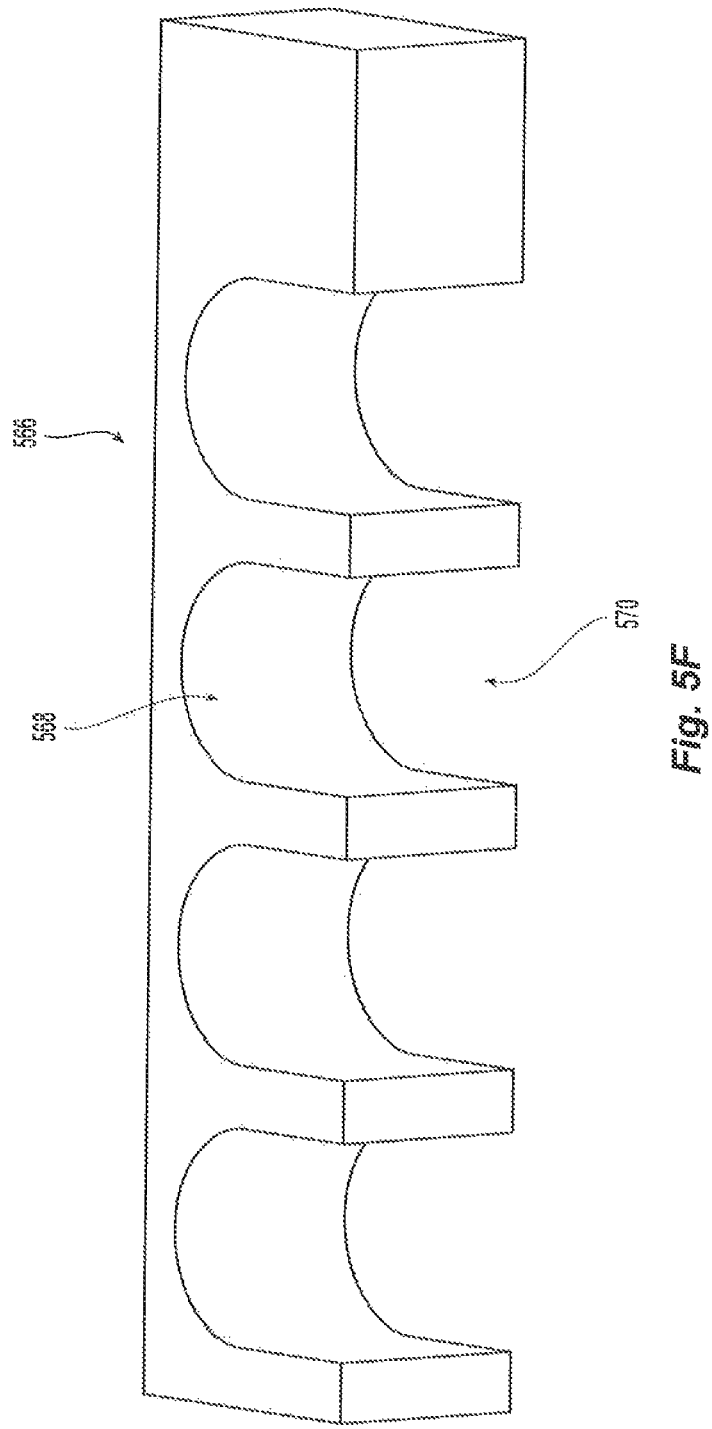
FIG. 5F is an isometric view of another monolith outer sole flue wall section with open fluid channels for use with the monolith sole flue shown in FIG. 5A and configured in accordance with embodiments of the technology.
Figure 5G:
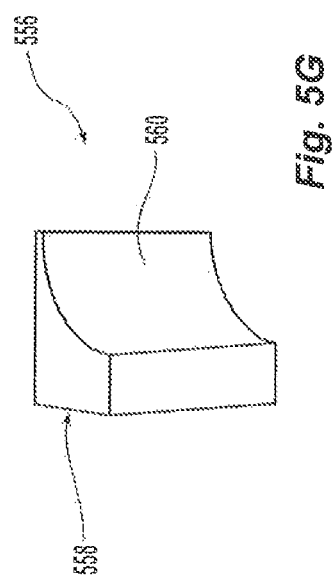
FIG. 5G is an isometric view of a monolith sole flue corner section for use with the monolith sole flue shown in FIG. 5A and configured in accordance with embodiments of the technology.
Figure 5H:
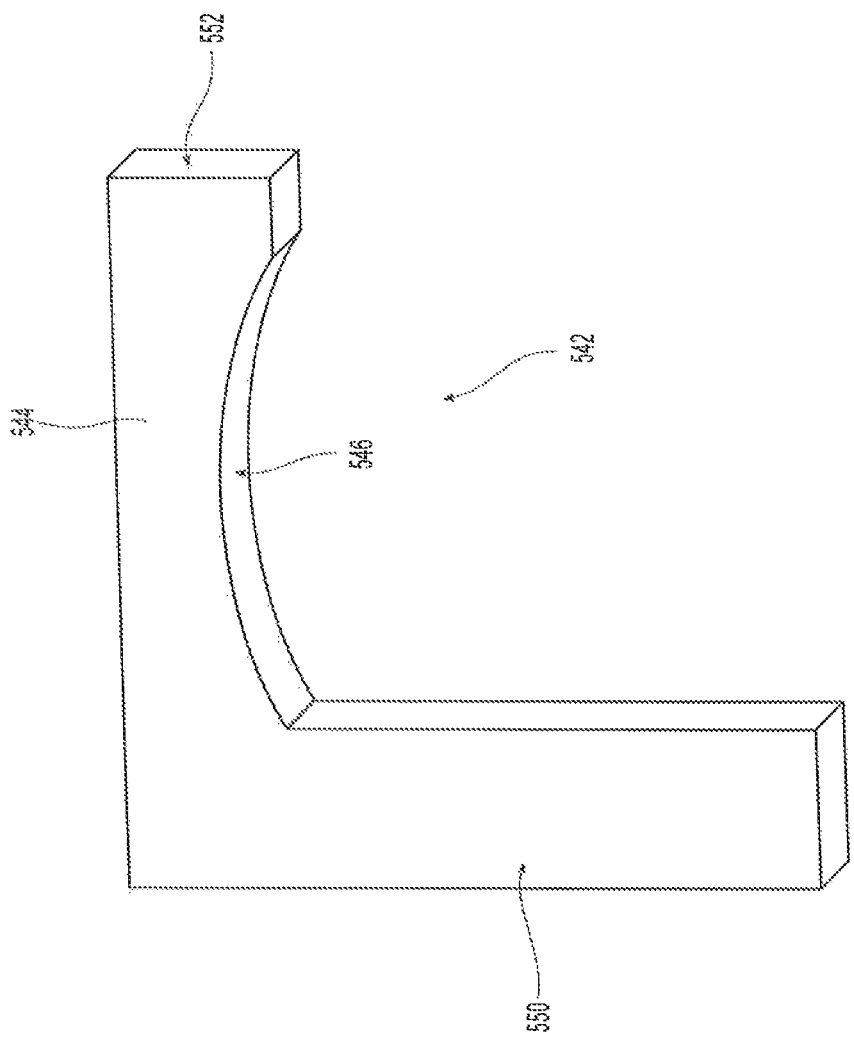
FIG. 5H is an isometric view of a monolith arch support for use with the monolith sole flue shown in FIG. 5A and configured in accordance with embodiments of the technology.

As the volatile gases travel along the fluid pathway through the sole flue 516, they are forced around end portions of the sole flue walls 520, which may stop short of meeting with sole flue end walls 540. The gap between the end portion of the sole flue walls 520 and the sole flue end walls 540 are, in various embodiments, provided with arch sections 542 to span the gap. In some embodiments, the arch sections 542 may be U-shaped, providing a pair of opposing legs to engage the sole flue floor 543 and an upper end portion to engage the oven floor. In other embodiments, the arch section 542 may be an arched or a flat cantilevered section integrated with and extending from the sole flue wall 520. In other embodiments, such as those depicted in FIGS. 5A and 5H, the arch sections 542 are J-shaped, having an upper end portion 544 with an arched lower surface 546 and an upper surface 548 that is shaped to engage the oven floor. A single leg 550 extends downwardly from one end of the upper end portion 544 to engage the sole flue floor 543. A side portion of the leg 550 is positioned closely adjacent the free end portion of the sole flue wall 520. A free end portion 552 of the upper end portion 544, opposite the leg 550, in some embodiments, engages an anchor point 554 on the sole flue wall 520 to support that side of the arch section 542. In some embodiments, the anchor point 554 is a recess or a notch formed in the sole flue wall 520. In other embodiments, the anchor point 554 is provided as a ledge portion of an adjacent structure, such as the sole flue end wall 540. As the volatile gases travel around end portions of the sole flue walls 520, the volatile gases encounter corners, in certain embodiments, where the sole flue end walls 540 meet outer sole flue walls 534 and sole flue walls 520. Such corners present, by definition, opposing surfaces that engage the volatile gases and induce turbulence that disrupt the smooth, laminar flow of the volatile gases. Accordingly, some embodiments of the present technology include sole flue corner sections 556 in the corners to reduce the disruption of the volatile gas flow. With reference to FIG. 5G, embodiments of the sole flue corner sections 556 include an angular rearward face 558 that is shaped to engage the corner areas of the sole flue 516. Opposite, forward faces 560 of the sole flue corner sections 556 are shaped to be curvilinear or concave. In other embodiments the corner section is a curved pocket. In operation, the curvilinear shape reduces dead flow zones and smooths out transitions in flow. In this manner, turbulence in the volatile gas flow may be reduced as the fluid pathway travels the corner areas of the sole flue 516. Top surfaces of the sole flue corner sections 556 may be shaped to engage the oven floor for additional support.

In various prior art coking ovens, the outer sole flue walls are formed from brick. Accordingly, the downcommer channels and the uptake channels that extend through the outer sole flue walls are formed with flat opposing walls that meet at corners. Accordingly, the fluid pathway through the downcommer channels and the uptake channels is turbulent and reduces optimal fluid flow. Moreover, the irregular surfaces of the brick and the angular geometry of the downcommer channels and the uptake channels promote the build-up of debris and particulate over time, which further restricts fluid flow. With reference to FIG. 5A and FIG. 5E, embodiments of the present technology form at least portions of the outer monolith sole flue walls 534 with monolith channel blocks 562. In some embodiments, the channel blocks 562 include one or more channels 564, having open ends that penetrate widths of the monolith channel blocks 562 and closed sidewalls. In other embodiments, monolith channel blocks 566 include one or more open channels 568 that have open ends that penetrate widths of the monolith channel blocks 566 and sidewalls that are open to one side of the monolith channel blocks 566 to define channel openings 570. In various embodiments, the monolith channel blocks 566 are positioned at the sole flue floor level. Channel blocks 562 are positioned on top of the monolith channel blocks 566 so that ends of the channels 564 and ends of the open channels 568 are placed in open fluid communication with one another. In this orientation, the channel openings 570 for one set of monolith channel blocks 566 may serve as the outlet for downcommer channels 512. Similarly, the channel openings 570 for another set of channel blocks 566 may serve as the inlet for the uptake channels 514. More than one channel block 562 may be positioned on top of each channel block 566, depending on the desired height of the outer sole flue wall 534 and the sole flue 516.

With reference to FIG. 6, the runs 517 of the sole flue 516 may be covered by an oven floor 660, which can comprise multiple monolith segments 662 made of thermally-volume-stable material. In particular, as shown in FIG. 6, a monolith over the sole flue 516 is formed from a plurality of side-by-side arches, each arch covering a run 517 of the sole flue 516. Lower end portions 664 of the monolith segments 662 are positioned on upper surfaces of the sole flue walls 520 and outer sole flue walls 534. According to further aspects, a planar monolith layer or a segmented brick layer may cover the top portion of the monolith segments 662. Further, as discussed previously with regard to other aspects of the present technology, the entire oven may be made of expanding and contracting monolith components or structures material so that some or all of the structural components of the oven can expand and contract with one another. Accordingly, if the monolith segments 662, sole flue walls 520, and the outer sole flue walls 534 are made of a thermally-volume-stable material, then the monolith segments 662, sole flue walls 520, and the outer sole flue walls 534 can stay generally aligned with one another upon heating and cooling. It is contemplated, however, that in certain applications, that one or more of the monolith segments 662, sole flue walls 520, and the outer sole flue walls 534 could be made from materials other than thermally-volume-stable material. Such instances may arise during a repair or retrofit of an existing coking oven with precast structural components. In further applications, the one or more of the monolith segments, sole flue walls, and outer flue walls could be made from alumina or other thermally expandable materials. It is similarly contemplated that some or all of the other components described herein, such as downcommer cover 118, the blocking wall sections 532, sole flue end walls 540, arch sections 542, sole flue corner sections 556, channel blocks 522, and channel blocks 523 could be formed from a thermally-volume-stable material and/or could be lined with thermally-volume-stable material.

In accordance with aspects of the disclosure, the oven may be constructed of monolith precast interlocking or interfacing shapes forming a precast oven. For example, the monolith crown with integral sidewalls may sit on a precast floor with monolith sole flue walls, thus the entire oven may be constructed of a plurality of precast shapes as shown in FIG. 1A. In alternative embodiments, the entire oven may be constructed of one precast piece. In further embodiments, the oven may be constructed of one or more precast shapes interfacing with individual bricks to form a hybrid oven construction. Aspects of the hybrid oven construction may be particularly efficient in oven repairs as further shown in the figures.

Figure 7:
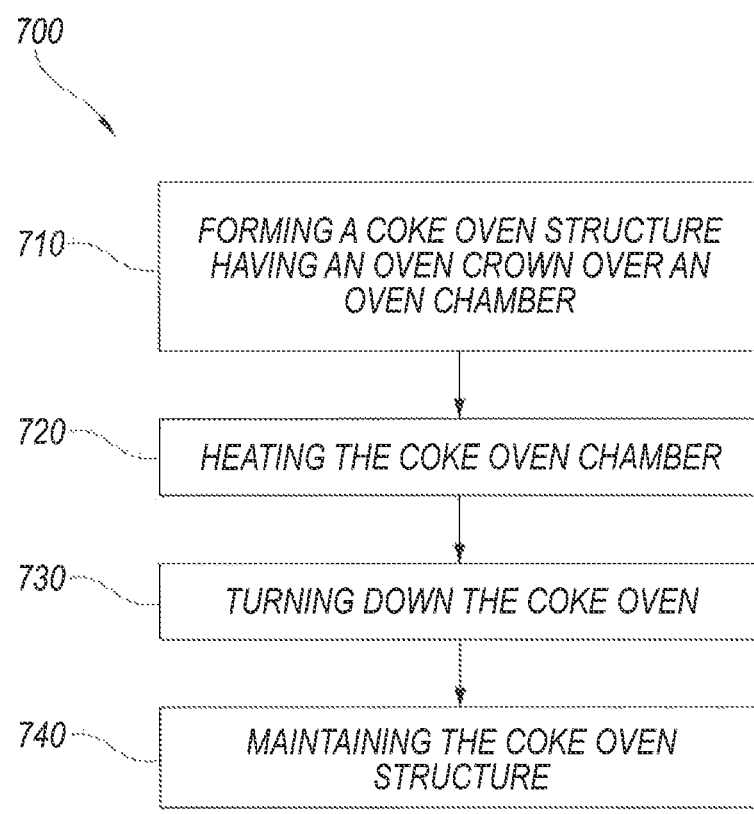
FIG. 7 is a block diagram illustrating a method of turning down a horizontal heat recovery coke oven having monolith component construction.

FIG. 7 is a block diagram illustrating a method 700 of turning down a horizontal heat recovery coke oven. The method may include use of a precast monolithic component to replace brick structures or may include a horizontal coke oven built of precast monolithic sections. At block 710, the method 700 includes forming a coke oven structure having an oven crown over an oven chamber. The crown or precast section may be an oven crown, an upcommer arch, a downcommer arch, a J-piece, a single sole flue arch or multiple sole flue arches, a downcommer cleanout, curvilinear corner sections, and/or combined portions of any of the above sections. In some embodiments, the crown is formed at least in part with a thermally-volume-stable material. In further embodiments, the crown is formed as a monolith (or several monolith segments) spanning between supports such as oven sidewalls. In further embodiments, the method 700 includes forming a coke oven structure having a plurality of monolithic sections.

At block 720, the method 700 includes heating the coke oven chamber. In some embodiments, the oven chamber is heated above the thermally-volume-stable temperature of a given material (e.g., above 1,200° F. in the case of a silica oven). The method 700 then includes turning down the coke oven below a thermally-volume-stable temperature at block 730. For materials having a thermally-volume-stable temperature, like silica, this comprises dropping the oven temperature below this temperature (e.g., below 1,200° F. in the case of a silica oven). For thermally-volume-stable materials, like fused silica, or materials not having a thermally-volume-stable temperature, like alumina, the step of turning down the coke oven below a thermally-volume-stable temperature comprises turning down the oven temperature to any lesser temperature. In particular embodiments, turning down the coke oven comprises turning off the coke oven entirely. In further embodiments, turning down the coke oven comprises turning down the coke oven to a temperature of about 1,200° F. or less. In some embodiments, the coke oven is turned down to 50% or less of the maximum operating capacity. At block 740, the method 700 further includes maintaining the coke oven structure, including the integrity of the oven crown. The oven is thus turned down without collapse as experienced in traditional ovens. In some embodiments, the oven is turned down without causing significant crown contraction. The method described above can be applied to a coking chamber, sole flue, downcommer, upcommer, walls, floors, or other portions of the oven.

EXAMPLES

The following Examples are illustrative of several embodiments of the present technology.

1. A coke oven chamber, comprising:
A monolith sole flue section having a serpentine path therein;
a front wall extending vertically upward from the monolith sole flue section and a back wall opposite the front wall;
a first sidewall extending vertically upward from the floor between the front wall and the back wall and a second sidewall opposite the first sidewall; and
a monolith crown positioned above the monolith sole flue section and spanning from the first sidewall to the second sidewall.

2. The coke oven chamber of claim 1 wherein the monolith crown comprises a plurality of monolith portions spanning from the first sidewall to the second sidewall, wherein the plurality of monolith portions are positioned generally adjacent to one another between the front wall and the back wall.

3. The coke oven chamber of claim 1 wherein:
at least one of the monolith crown or sidewalls are configured to translate, contract, or expand by an adjustment amount upon heating or cooling the coke oven chamber;
the monolith crown comprises a first end portion resting on the first sidewall and a second end portion opposite the first end portion and resting on the second sidewall; and
the first sidewall and the second sidewall have an interface area greater than the adjustment amount.

4. The coke oven chamber of claim 3 wherein the monolith crown comprises a plurality of adjacent arches.

5. The coke oven chamber of claim 1 wherein the monolith crown comprises a non-arch shape.

6. The coke oven chamber of claim 1 wherein the monolith crown comprises a generally flat shape.

7. The coke oven chamber of claim 1 wherein the monolith crown comprises a thermally-volume-stable material.

8. The coke oven chamber of claim 1 wherein the monolith crown comprises at least one of a fused silica, zirconia, or refractory material.

9. The coke oven chamber of claim 1 wherein the chamber comprises a horizontal heat recovery coke oven chamber.

10. The coke oven chamber of claim 1 wherein the monolith crown meets at least one of the first sidewall or the second sidewall with an overlapping or interlocking joint.

11. The coke oven chamber of claim 1 wherein the first and second sidewall are monolith sections.

12. The coke oven chamber of claim 1 wherein the sole flue section, the first and second sidewalls and the crown section are monolith components.

13. The coke oven chamber of claim 1 wherein the oven includes substantially no bricks.

14. A coke oven chamber, comprising:
a chamber floor;
a plurality of sidewalls generally orthogonal to the chamber floor; and
a monolith component positioned above the chamber floor and at least partially spanning an area between at least two sidewalls, wherein the monolith component comprises a thermally-volume-stable material.

15. The coke oven chamber of claim 14 wherein the thermally-volume-stable material comprises fused silica or zirconia.

16. The coke oven chamber of claim 14 wherein the monolith component comprises a surface parallel, arched, or angled relative to the floor.

17. The coke oven chamber of claim 14 wherein the chamber comprises a coking chamber or a sole flue.

18. The coke oven chamber of claim 17 wherein the chamber comprises a plurality of monolith components.

19. A method of turning down a horizontal heat recovery coke oven, the method comprising:
forming a coke oven structure having a floor, a first sidewall and a second sidewall opposite the first sidewall, and an oven crown over the floor in a space at least partially between the first sidewall and the second sidewall, wherein at least one of the floor, the first sidewall, the second sidewall, or the oven crown are monolithic components;
heating the coke oven;
turning down the coke oven below a thermally-volume-stable temperature; and
maintaining the coke oven structure.

20. The method of claim 19 wherein forming the coke oven structure comprises forming an oven at least partially of thermally-volume-stable material.

21. The method of claim 19 wherein forming the coke oven structure comprises forming a monolith spanning at least a portion of a distance between the first sidewall and the second sidewall.

22. The method of claim 19 wherein forming the coke oven structure comprises forming a coke oven structure at least partially of silica brick, and wherein turning down the coke oven below a thermally-volume-stable temperature comprises turning down the coke oven below a temperature of 1,200° F.

23. The method of claim 19 wherein turning down the coke oven comprises turning down oven operation to 50% of operational capacity or less.

24. The method of claim 19 wherein turning down the coke oven comprises turning off the oven.

25. A coke oven chamber, comprising:
an oven floor;
a forward end portion and a rearward end portion opposite the forward end portion;
a first sidewall extending vertically upward from the floor between the front wall and the back wall and a second sidewall opposite the first sidewall;
a crown positioned above the floor and spanning from the first sidewall to the second sidewall; and
a sole flue comprising a thermally-volume-stable material and having a plurality of adjacent runs between the first sidewall and the second sidewall.

26. The coke oven chamber of claim 25 wherein the thermally-volume-stable material comprises fused silica or zirconia.

27. The coke oven chamber of claim 25 wherein the sole flue includes at least one sole flue wall comprised of a plurality of sole flue wall segments.

28. The coke oven chamber of claim 27 wherein the sole flue wall segments are comprised of a thermally-volume-stable material.

29. The coke oven chamber of claim 27 wherein the sole flue wall segments are coupled with one another by cooperating ridge and groove features associated with end portions of the sole flue wall segments.

30. The coke oven chamber of claim 27 wherein the sole flue wall segments are coupled with one another by cooperating notch and projection features associated with end portions of the sole flue wall segments.

31. The coke oven chamber of claim 25 wherein the sole flue includes at least one blocking wall section coupled with, and extending generally transverse from, at least one sole flue wall; the at least one blocking wall section comprising of a thermally-volume-stable material.

32. The coke oven chamber of claim 31 wherein the at least one blocking wall section and at least one sole flue wall are coupled with one another by cooperating ridge and groove features associated with an end portion of the at least one blocking wall segment and a side portion of the at least one sole flue wall.

33. The coke oven chamber of claim 25 wherein the sole flue includes at least one generally J-shaped arch section spanning a gap between an end portion of at least one sole flue wall and a sole flue end wall.

34. The coke oven chamber of claim 33 wherein the arch section includes an arched upper end portion and a leg depending from one end of the upper end portion; an opposite free end of the arched upper end portion operatively coupled with the sole flue end wall between a sole flue floor and the oven floor.

35. The coke oven chamber of claim 33 wherein the at least one arch section is comprised of a thermally-volume-stable material.

36. The coke oven chamber of claim 25 wherein the sole flue includes at least one sole flue corner section having a rearward face that is shaped to engage a corner area of at least one of the plurality of adjacent runs and an opposing, curvilinear or concave forward face; the sole flue corner section being positioned to direct fluid flow past the corner area.

37. The coke oven chamber of claim 36 wherein the at least one sole flue corner section is comprised of a thermally-volume-stable material.

38. The coke oven chamber of claim 25 wherein the sole flue includes at least one sole flue corner section having a rearward face that is shaped to engage a corner area of at least one of the plurality of adjacent runs and an opposing, curvilinear or concave forward face; the sole flue corner section being positioned to direct fluid flow past the corner area.

39. The coke oven chamber of claim 25 wherein the oven chamber is further comprised of downcommer channels that extend through at least one of the first sidewall and second sidewall; the downcommer channels being in open fluid communication with the oven chamber and the sole flue.

40. The coke oven chamber of claim 39 wherein the downcommer channels have curved sidewalls.

41. The coke oven chamber of claim 39 wherein the downcommer channels have various geometric shapes cross-sections.

42. The coke oven chamber of claim 39 wherein the downcommer channels are cast using a thermally-volume-stable material.

43. The coke oven chamber of claim 39 wherein the downcommer channels are formed from a plurality of channel blocks having channels that penetrate the channel blocks; the plurality of channel blocks being vertically stacked such that channels from adjacent channel blocks align with one another to define sections of downcommer channels.

44. The coke oven chamber of claim 43 wherein at least one channel block includes channels that penetrate upper and lower end portions of the channel block and a side of the channel block to provide outlets for the downcommer channels.

45. The coke oven chamber of claim 39 further comprising a downcommer cover operatively coupled with an opening to at least one downcommer channel; the downcommer cover including a plug that is shaped to be received within an access opening that penetrates the downcover cover.

46. The coke oven chamber of claim 25 wherein the oven chamber is further comprised of uptake channels that extend through at least one of the first sidewall and second sidewall; the uptake channels being in open fluid communication with the sole flue and a fluid outlet of the coke oven chamber.

47. The coke oven chamber of claim 46 wherein the uptake channels have various geometric shapes sidewalls.

48. The coke oven chamber of claim 46 wherein the uptake channels have various geometric shapes cross-sections.

49. The coke oven chamber of claim 46 wherein the uptake channels are cast using a thermally-volume-stable material.

50. The coke oven chamber of claim 46 wherein the uptake channels are formed from a plurality of channel blocks having channels that penetrate the channel blocks; the plurality of channel blocks being vertically stacked such that channels from adjacent channel blocks align with one another to define sections of uptake channels.

51. The coke oven chamber of claim 50 wherein at least one channel block includes channels that penetrate upper and lower end portions of the channel block and a side of the channel block to provide inlets for the uptake channels.

From the foregoing it will be appreciated that, although specific embodiments of the technology have been described herein for purposes of illustration, various modifications may be made without deviating from the spirit and scope of the technology. For example, while several embodiments have been described in the context of HHR ovens, in further embodiments, the monolith or thermally-volume-stable designs can be used in non-HHR ovens, such as byproduct ovens. Further, certain aspects of the new technology described in the context of particular embodiments may be combined or eliminated in other embodiments. For example, while certain embodiments have been discussed in the context of a crown for a coking chamber, the flat crown, monolith crown, thermally-volume-stable materials, and other features discussed above can be used in other portions of a coke oven system, such as a crown for a sole flue. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein Thus, the disclosure is not limited except as by the appended claims.

We claim:

1. A method of turning down a horizontal heat recovery coke oven, the method comprising:
   heating a coke oven structure having a floor, a first sidewall, a second sidewall opposite the first sidewall, and an oven crown over the floor in a space at least partially between the first sidewall and the second sidewall, wherein the first sidewall and the oven crown together are a monolithic component;
   turning down the coke oven structure below a temperature; and
   maintaining the coke oven structure.

2. The method of claim 1, wherein the coke oven structure comprises a monolith spanning at least a portion of a distance between the first sidewall and the second sidewall.

3. The method of claim 1, wherein the coke oven structure comprises silica brick, and wherein the temperature is 1,200° F.

4. The method of claim 1, wherein turning down the coke oven structure comprises turning down oven operation to 50% or less of operational capacity.

5. The method of claim 1, wherein turning down the coke oven structure comprises turning off the oven.

6. The method of claim 1, wherein the monolithic component is the first sidewall, the oven crown, and the second sidewall together.

7. The method of claim 1, wherein the monolith, component is configured to expand upon heating and contract upon cooling as a single structure.

8. The method of claim 1, wherein the coke oven structure further comprises a sole flue comprising a first sole flue sidewall, a second sole flue sidewall opposing the first sole flue sidewall, and a monolith sole flue crown spanning from the first sole flue sidewall to the second sole flue sidewall.

9. A method of manufacturing a coke oven, the method comprising:
   forming a coke oven structure having a floor, a first sidewall, a second sidewall opposite the first sidewall, and an oven crown over the floor in a space at least partially between the first sidewall and the second sidewall, wherein the first sidewall and the oven crown together are a monolithic component.

* * * * *

UNITED STATES PATENT AND TRADEMARK OFFICE
CERTIFICATE OF CORRECTION

PATENT NO. : 11,795,400 B2
APPLICATION NO. : 17/190720
DATED : October 24, 2023
INVENTOR(S) : Gary Dean West et al.

It is certified that error appears in the above-identified patent and that said Letters Patent is hereby corrected as shown below:

On the Title Page

On Page 8, Column 1 item (56) (Other Publications), Line 5, delete "Reportin" and insert --Report in-- therefor.
On Page 8, Column 1 item (56) (Other Publications), Line 19, delete "Appliction" and insert --Application-- therefor.

In the Specification

In Column 1 (Background), Line 34, delete "devolatilin" and insert --devolatilize-- therefor.
In Column 1 (Background), Line 64, delete "owns," and insert --ovens,-- therefor.
In Column 2 (Background), Line 20, delete ""EHR")" and insert --("HHR")-- therefor.
In Column 6 (Detailed Description), Line 35, delete "160" and insert --180-- therefor.
In Column 6 (Detailed Description), Line 43, delete "160." and insert --180.-- therefor.
In Column 6 (Detailed Description), Line 55, delete "160," and insert --180,-- therefor.
In Column 12 (Detailed Description), Line 61, delete "funs" and insert --runs-- therefor.
In Column 20 (Detailed Description), Line 17, after "herein", insert --.--.

In the Claims

In Column 20 (Claim 7), Line 45, delete "monolith," and insert --monolithic-- therefor.

Signed and Sealed this
Eighth Day of July, 2025

Coke Morgan Stewart
*Acting Director of the United States Patent and Trademark Office*